United States Patent
Naruishi et al.

(10) Patent No.: US 8,234,993 B2
(45) Date of Patent: Aug. 7, 2012

(54) IMPACT DETECTOR AND PACKAGING CONTAINER

(75) Inventors: Moku Naruishi, Kawasaki (JP); Sakae Ishikawa, Yokohama (JP); Tomoaki Arai, Yamato (JP)

(73) Assignee: Ricoh Company, Limited, Tokyo (JP)

( * ) Notice: Subject to any disclaimer, the term of this patent is extended or adjusted under 35 U.S.C. 154(b) by 62 days.

(21) Appl. No.: 12/662,990

(22) Filed: May 14, 2010

(65) Prior Publication Data

US 2010/0300178 A1 Dec. 2, 2010

(30) Foreign Application Priority Data

May 26, 2009 (JP) ................................. 2009-126117
Jan. 27, 2010 (JP) ................................. 2010-015107

(51) Int. Cl.
*G01L 5/00* (2006.01)
*G01N 3/30* (2006.01)

(52) U.S. Cl. ...... 116/203; 116/200; 73/12.06; 73/12.09; 73/12.13

(58) Field of Classification Search ................. 73/12.01, 73/12.05, 12.09, 12.06; 116/200, 202, 203, 116/204, 211, 212, 267, 276
See application file for complete search history.

(56) References Cited

U.S. PATENT DOCUMENTS

| | | | | |
|---|---|---|---|---|
| 3,373,716 A | * | 3/1968 | Williams | 116/203 |
| 3,623,449 A | * | 11/1971 | Knutson | 116/203 |
| 3,688,734 A | * | 9/1972 | Davis et al. | 116/215 |
| 3,707,722 A | * | 12/1972 | Itoh | 346/7 |
| 3,835,809 A | * | 9/1974 | Sinn, Jr. | 116/203 |
| 3,909,568 A | * | 9/1975 | Greenhut | 200/61.45 R |
| 3,921,463 A | * | 11/1975 | Robbins | 73/492 |
| 4,060,004 A | * | 11/1977 | Scholz et al. | 340/436 |
| 4,068,613 A | * | 1/1978 | Rubey | 116/203 |
| 4,125,085 A | * | 11/1978 | Rubey | 116/203 |
| 4,177,751 A | * | 12/1979 | Rubey | 116/201 |
| 4,237,736 A | * | 12/1980 | Wright | 73/492 |
| 4,361,106 A | * | 11/1982 | Eklof | 116/203 |
| 4,470,302 A | * | 9/1984 | Carte | 73/492 |
| 6,553,930 B1 | * | 4/2003 | Johnston et al. | 116/212 |
| 6,712,274 B2 | * | 3/2004 | Dvorkis et al. | 235/472.01 |
| 6,848,389 B1 | * | 2/2005 | Elsasser et al. | 116/203 |
| 7,219,619 B2 | * | 5/2007 | Fitzer et al. | 116/203 |
| 7,469,595 B2 | * | 12/2008 | Kessler et al. | 73/802 |

(Continued)

FOREIGN PATENT DOCUMENTS

JP 2001-108703 4/2001

(Continued)

*Primary Examiner* — Lisa Caputo
*Assistant Examiner* — Jonathan Dunlap
(74) *Attorney, Agent, or Firm* — Harness, Dickey & Pierce, P.L.C.

(57) ABSTRACT

An impact detector includes a case, an impact indicator disposed on a front side of the case, to indicate an impact history of the impact detector, a first weight that moves inside the case to a side to which the case falls, causing the impact indicator to indicate the impact history by moving through at least one of a first transition path and a second transition path, a first guide member to guide the first weight to a first impact detection position along the first transition path when the case falls in a first direction, and a second guide member to guide the first weight to the second impact detection position along the second transition path when the case falls in a second direction. The first transition path at least partly overlaps with the second transition path on a projection plane on the front side of the case.

20 Claims, 16 Drawing Sheets

U.S. PATENT DOCUMENTS

| | | | |
|---|---|---|---|
| 7,509,835 B2 * | 3/2009 | Beck | 73/12.01 |
| 2005/0217558 A1 * | 10/2005 | Fitzer et al. | 116/203 |
| 2007/0089480 A1 * | 4/2007 | Beck | 73/12.01 |
| 2009/0249858 A1 * | 10/2009 | Ishikawa et al. | 73/12.06 |
| 2010/0050733 A1 | 3/2010 | Naruishi | |
| 2010/0281946 A1 | 11/2010 | Naruishi et al. | |

FOREIGN PATENT DOCUMENTS

| | | |
|---|---|---|
| JP | 2001-199475 | 7/2001 |
| JP | 3145187 | 9/2008 |
| JP | 2009-156726 | 7/2009 |

* cited by examiner

US 8,234,993 B2

IMPACT DETECTOR AND PACKAGING CONTAINER

CROSS-REFERENCE TO RELATED APPLICATIONS

This patent specification is based on and claims priority from Japanese Patent Application Nos. 2009-126117, filed on May 26, 2009, and 2010-015107 filed on Jan. 27, 2010 in the Japan Patent Office, the contents of which are hereby incorporated by reference herein in its entirety.

BACKGROUND OF THE INVENTION

1. Field of the Invention

The present invention generally relates to an impact detector to detect impact to an article and a packaging container including the impact detector.

2. Discussion of the Background Art

In the course of transport, it sometimes happens that fragile packaged articles such as precision apparatuses fall or drop due to careless handling, accidents, or the like. The impact of the fall or drop can damage the articles. For this reason, therefore, impact detectors are typically attached to packaged articles to detect whether or not the article has been subjected to impact.

For example, impact detectors that detect falling of packaged articles in three-dimensions, that is, in both anteroposterior direction and lateral directions, typically use two movable members (e.g., weights) such as spheres contained in a case body. The interior of the case body is divided into an initial position-retaining compartment and a transition compartment to retain each sphere at an initial position and at an impact detection position, respectively. Although the initial position-retaining compartment and the transition compartment are separated by a partition, a hole is formed in the partition to allow the spheres to move between the initial position-retaining compartment and the transition compartment upon sufficient impact. Additionally, each sphere at the impact detection position is visible through an inspection window formed in the case body.

However, although falling of the packaged article can be detected in both the anteroposterior direction and the lateral direction, this configuration has several drawbacks. For example, this configuration makes the impact detector relatively bulky because a path through which the weight moves from the initial position to the impact detection position is formed for each of impact to a back side and impact to a front side. In addition, because a single inspection window is used to detect both anteroposterior impact and lateral impact, users cannot identify the direction in which the packaged article has fallen because this configuration does not distinguish between anteroposterior impact and lateral impact, that is, for example, between the back side and a right side and between the front side and a left side.

Therefore, the inventor of the present invention recognizes that there is a need for a compact impact detector that can provide impact history data on the packaged article distinguishable in multiple different directions, which known approaches fail to do.

SUMMARY OF THE INVENTION

In view of the foregoing, one illustrative embodiment of the present invention provides an impact detector to detect falling of an article to which the impact detector is attached in at least one of a first direction and a second direction opposite the first direction.

The impact detector includes a case, an interior of which defines a first transition path and a second transition path, an impact indicator disposed on a front side of the case, to indicate an impact history of the impact detector when the case falls in at least one of the first direction and the second direction, a first weight disposed inside the case, that moves to a side to which the case falls, a first guide member provided along the first transition path in the case, and a second guide member provided along the second transition path in the case. The first weight causes the impact indicator to indicate the impact history by moving through at least one of the first transition path and the second transition path. The first guide member guides the first weight from an initial position to a first impact detection position along the first transition path when the case falls in the first direction, and a second guide member to guide the first weight from the initial position to the second impact detection position along the second transition path when the case falls in the second direction. The first transition path at least partly overlaps with the second transition path on a projection plane on the front side of the case.

Another illustrative embodiment of the present invention provides a packaging container for containing an article, incorporating the impact detector described above.

BRIEF DESCRIPTION OF THE DRAWINGS

A more complete appreciation of the disclosure and many of the attending advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
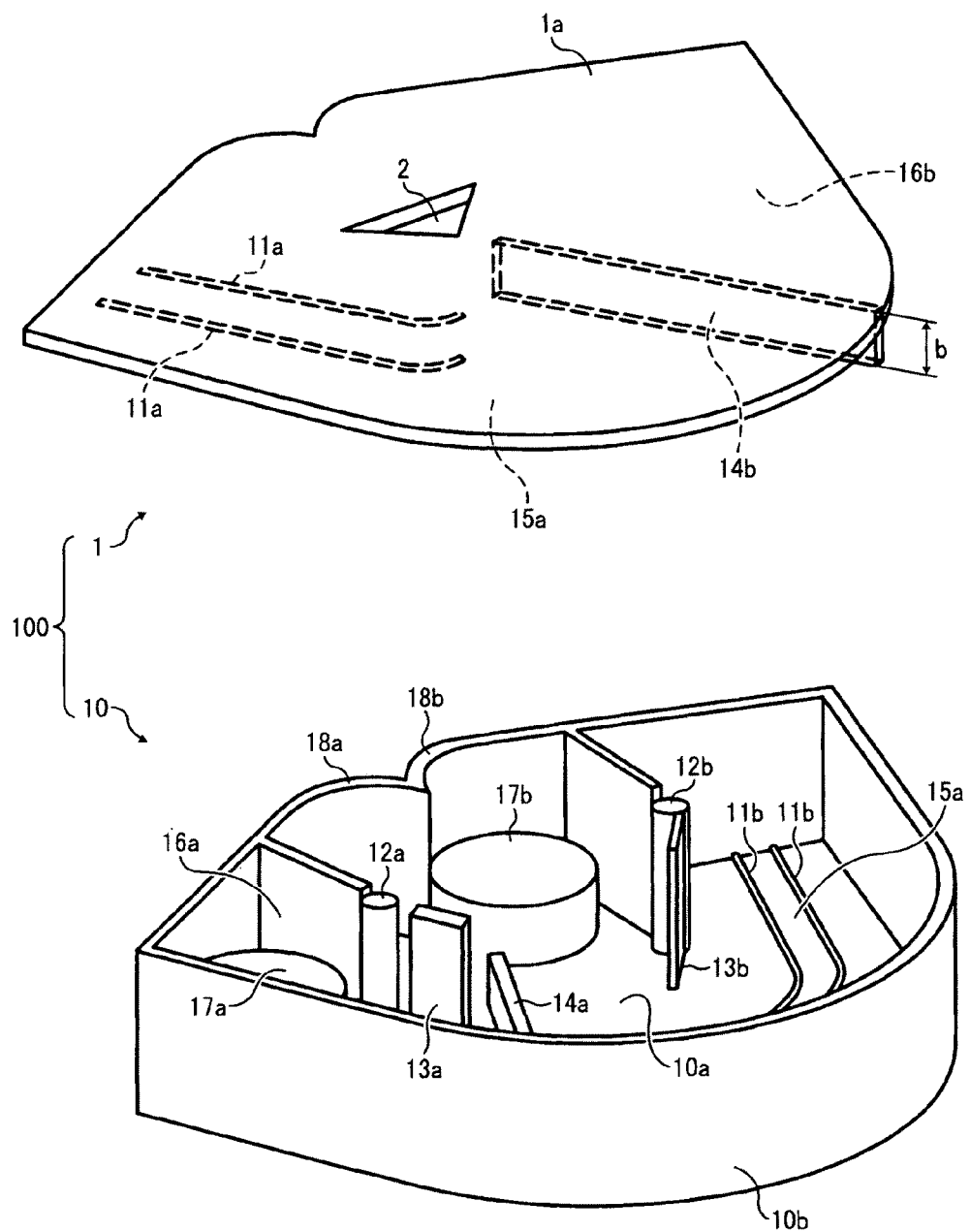
FIG. 1 is an exploded perspective view illustrating an impact detector according to an illustrative embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIGS. 1 through 4, an impact detector according to an illustrative embodiment of the present invention is described.

Figure 2:
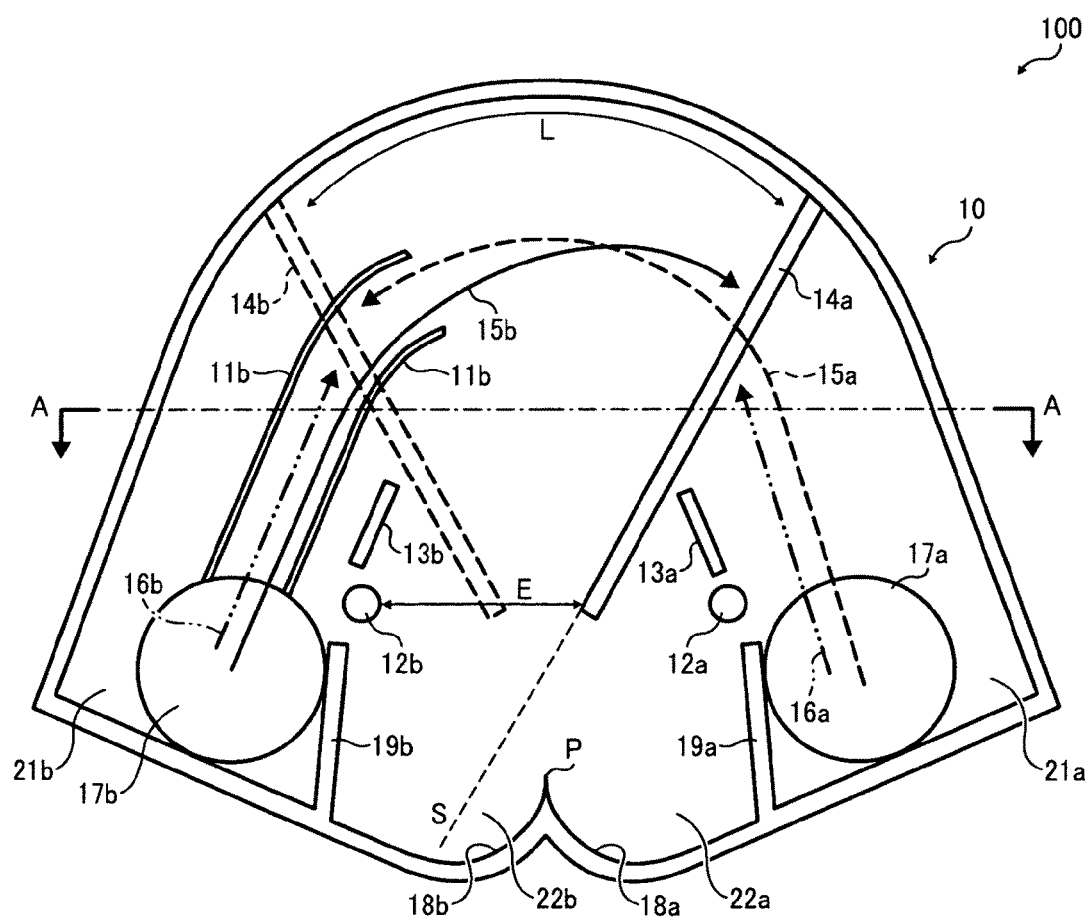
FIG. 2 schematically illustrates from a front side a cross section of the impact detector in an initial state before falling.
Figure 3:
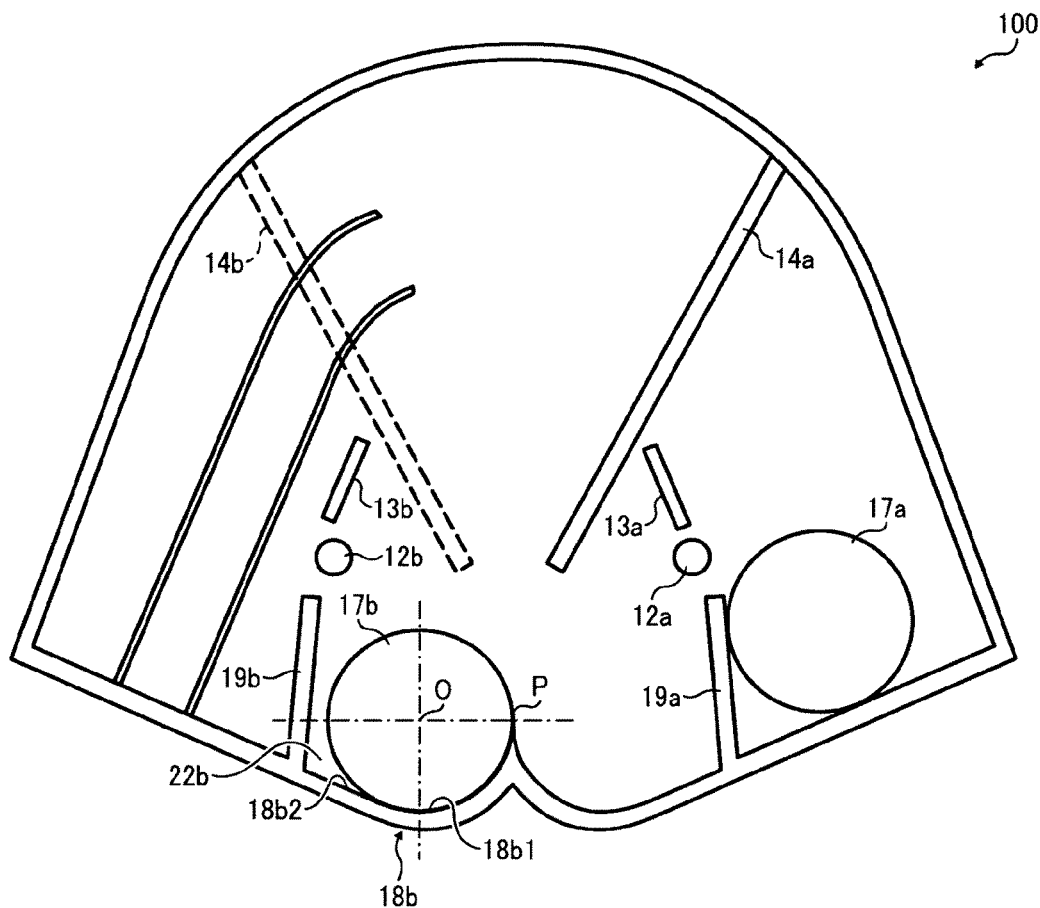
FIG. 3 is a schematic view illustrating the impact detector after falling in a first direction.
Figure 4:
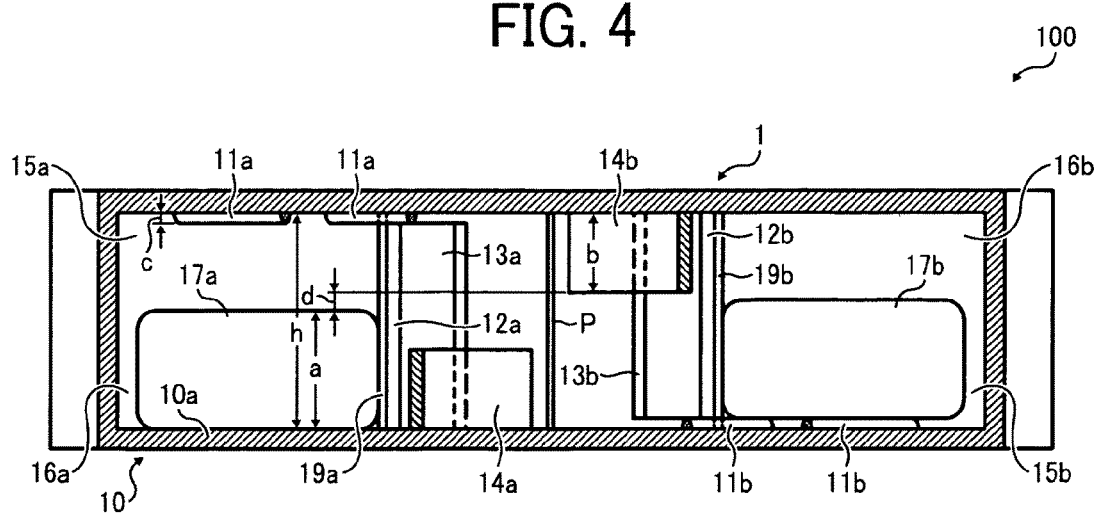
FIG. 4 illustrates a cross section of the impact detector along a line A-A shown in FIG. 2.

FIG. 1 is an exploded perspective view illustrating the impact detector according to an illustrative embodiment of the present invention, FIG. 2 is a schematic front view illustrating an initial state of the impact detector from a front side, FIG. 3 is a schematic view illustrating the impact detector after falling in a first direction, and FIG. 4 illustrates a cross section of the impact detector along a line A-A shown in FIG. 2.

Referring to FIG. 1, an impact detector 100 includes a lid 1, a case body 10 configured to engage the lid 1, and weights 17a and 17b, respectively serving as a first weight and a second weight, disposed inside the case body 10. The lid 1 and the case body 10 together form a case. In the present embodiment, the weights 17a and 17b are columnar and have a circular periphery. An inspection window 2 serving as an impact indicator is formed in the lid 1, positioned in a lower portion when the impact detector 100 is in the initial state (e.g., standing position) shown in FIG. 2. For example, the impact detector 100 can be attached to a vertical surface or buried in a recess formed in the vertical surface of a packaged article in the position shown in FIG. 2.

The impact detector 100 can indicate anteroposterior impact history, falling to at least one of the side of the lid 1 (front side) and the side of the case body 10 (back side) of the packaged article to which the impact detector 100 is attached, that is, a front side and a back side of paper on which FIG. 2 is drawn. It is to be noted that "impact history" in this specification simply means falling events of the impact detector 100 and the impact detector 100 does not mean showing the falling events chronologically.

Referring to FIG. 2, when the impact detector 100 is in the initial state, the weights 17a and 17b are respectively at the initial positions 21a and 21b positioned on the right and left sides in a lower portion of the case body 10 shown in FIG. 2. When the impact detector 100 tilts from the state shown in FIG. 2 and falls to the side of the lid 1 (a first direction), the weight 17a moves from the initial position 21a through a transition path 15a serving as a first transition path to an impact detection position 22a, positioned in a lower center portion of the impact detector 100, and the weight 17a at the impact detection position 22a can be observed through the inspection window 2 formed in the lid 1 shown in FIG. 1. The lid 1 is disposed on a front side of the impact detector 100, and thus the inspection window 2 is on the front side of the impact detector 100.

Similarly, when the impact detector 100 falls to the side of the case body 10 in FIG. 2 (a second direction), the weight 17b moves from the initial position 21b through a transition path 15b serving as a second transition path to an impact detection position 22b positioned in the lower center portion as shown in FIG. 3, and the weight 17b at the impact detection position 22b can be observed through the inspection window 2 formed in the lid 1 shown in FIG. 1.

That is, a user can know that the impact detector 100 has fallen to the side of the lid 1 (first direction) when the weight 17a is visible through inspection window 2 and that the impact detector 100 has fallen to the side of the case body 10 (second direction) when the weight 17b is visible through the inspection window 2. In the present embodiment, the weights 17a and 17b are colored or marked differently at least partly to facilitate identification of the weight 17a or 17b visible through the inspection window 2. Additionally, the weights 17a and 17b can be colored differently at least partly from other components of the impact detector 100 to facilitate detection of impact history of the impact detector 100. In this case, the color of the weights 17a and 17b can be identical or different.

Additionally, in the configuration shown in FIG. 2, the transition paths 15a and 15b overlap in an area L on a projection plane in parallel to the front side.

Referring to FIG. 1, the lid 1 includes a planar body 1a formed of a synthetic resin plate in which the inspection window 2 is formed, a regulation member 14b to regulate the movement of the weight 17a, and guide members 11a to guide the weight 17a. The guide members 11a in the present embodiment are rails (hereinafter also "rails 11a"). The regulation member 14b and the rails 11a are formed on a back side of the lid 1 facing the case body 10, and the inspection window 2 is triangular in the present embodiment. In FIG. 1, reference character b represents a height of the regulation member 14b.

The case body 10 can be formed of synthetic resin and include the planar body 10a and a side wall 10b projecting from an edge portion of the planar body 10a. Guide members 11b such as rails (hereinafter also "rails 11b") to guide the weight 17b, bosses 12a and 12b, guide members 13a and 13b to guide the weights 17a and 17b, a regulation member 14a, and retaining members 19a and 19b are formed on an inner surface of the planar body 10a facing the lid 1. The bosses 12a and 12b connect together the lid 1 and the case body 10 and regulate the movement of the weights 17a and 17b. The regulation member 14a guides the weight 17a and regulates the movement of the weight 17b. The retaining members 19a and 19b retain the weights 17a and 17b at the initial positions 21a and 21b, respectively. Thus, the rails 11a, the boss 12a, the guide member 13a, and the regulation member 14b serve as a first guide member disposed along the first transition path, and the rails 11b, the boss 12b, the guide member 13b, and the regulation member 14a serve as a second guide member disposed along the second transition path.

When the lid 1 is attached to the case body 10, the transition paths 15a and 15b and return paths 16a and 16b are formed in a compartment defined by the lid 1 and the case body 10. Herein, the weight 17a moves from the initial position 21a through the transition path 15a to the impact detection position 22a when the impact detector 100 falls in the first direction, to the side of the lid (hereinafter "lid side") as described above. By contrast, when the impact detector 100 falls in the second direction, to the side of the case body 10 (hereinafter "case-body side"), the weight 17a moves through the return path 16a until it contacts the regulation member 14a and then returns to the initial position 21a when the fallen impact detector 100 reverts to the initial standing position.

Similarly, the weight 17b moves from the initial position 21b to the impact detection position 22b through the transition path 15b when the impact detector 100 falls in the second direction (case-body side) as described above. When the impact detector 100 falls in the first direction (lid side), the weight 17b moves through the return path 16b until it contacts the regulation member 14b and then returns to the initial position 21b when the fallen impact detector 100 reverts to the initial state shown in FIG. 2.

In other words, the regulation member 14a, projecting from the planar body 10a of the case body 10, provides a space through which the weight 17a moves between the lid 1 and the case body 10 and thus forms the transition path 15a. Therefore, the weight 17a can move through the transition path 15a until it contacts the regulation member 14b and then moves to the impact detection position 22a, guided by a curved portion 18a of the side wall 10b of the case body 10.

Similarly, the regulation member 14b, projecting from the planar body 1a of the lid 1, provides a space through which the weight 17b moves between the lid 1 and the planar body 10a of the case body 10 and thus forms the transition path 15b. With this configuration, the weight 17b can move through the transition path 15b until it contacts the regulation member 14a and then moves to the impact detection position 22b, guided by a curved portion 18b of the side wall 10b of the case body 10.

The regulation member 14a has a height sufficient for the weights 17a and 17b to move through the transition paths 15a and 15b, respectively. Similarly, the height b of the regulation member 14b is sufficient for the weights 17a and 17b to move through the transition paths 15a and 15b, respectively.

Additionally, as shown in FIG. 2, the regulation member 14a is positioned so that an extension line S extending from the regulation member 14a crosses the curved portion 18b, that is, in FIG. 2, the extension line S passes a given point on the left of an apex P between the curved portions 18a and 18b. Additionally, a distance E shown in FIG. 2 between a circumference of the boss 12b to a lower end portion of the regulation member 14a is greater than the diameter of the weight 17b, which is guided by an oblique surface of the regulation member 14a. The regulation member 14b is positioned similarly.

Referring to FIG. 4, in the present embodiment, when the lid 1 is attached to the case body 10, a distance h between the planar body 1a of the lid 1 and the planer body 10a of the case body 10 is a sum of a height (thickness) a of the weight 17a and 17b, the height b of the regulation members 14a and 14b, a height c of the rails 11a and 11b, and a length d of a gap between an upper surface of the weights 17a (gap d) and the regulation member 14b (h=a+b+c+d). The distance h is smaller than twice the height of the weight 17a and 17b (a×2) to reduce the thickness of the impact detector 100, that is, a vertical length of the impact detector 100 in FIG. 4. With this configuration, the transition path 15a and the return path 16a can overlap in the vertical direction in FIG. 4, and the transition path 15b and the return path 16b can overlap in the vertical direction in FIG. 4.

Referring to FIG. 3, the curved portion 18b includes a curved surface 18b1 and an oblique surface 18b2 so that the weight 17b guided by the regulation member 14a can be kept at the impact detection position 22b to be visible through the inspection window 2. It is to be noted that the curved portion 18a has a similar shape to that of the curved portion 18b.

The curved surface 18b1 is shaped along the circumference of the weight 17b. The curved surface 18b1 can increase the contact area between the curved portion 18b and the weight 17b, thus contributing to reliable positioning of the weight 17b. In other words, with this configuration, the weight 17b can hit the boss 12b easily when the weight 17b shown in FIG. 3 falls to either the first direction to the lid 1 or the second direction to the case body 10. This configuration can facilitate control of the direction in which the weight 17b moves.

Additionally, in FIG. 3, the apex P formed between the curved portions 18a and 18b is positioned above a horizontal line passing a center O of the weight 17b. This configuration can prevent the weight 17b from moving obliquely to the right in FIG. 3 when the weight 17b shown in FIG. 3 falls to either the lid side or the case-body side. By setting the height of the apex P as described above, when the impact detector 100 falls again, the weight 18b can move upward in FIG. 3, hit the boss 12b, and then return to the curved portion 18b. Thus, the weight 17b can be prevented from returning to the initial position 21b.

Thus, in FIG. 3, the boss 12b is disposed at least partly inside (in FIG. 3, on the right of) a left end portion of the weight 17b contacting the curved surface 18b1 to prevent the weight 17b from returning from the impact detection position 22b (shown in FIG. 2) to the initial position 21b when the impact detector 100 falls. The boss 12a has a similar shape to that of the boss 12b.

The guide member 13a guides the weight 17a moving through the transition path 15a and the return path 16a, and the guide member 13b guides the weight 17b moving through the transition path 15b and the return path 16b.

Next, operation of the impact detector 100 is described below.

Figure 5A:
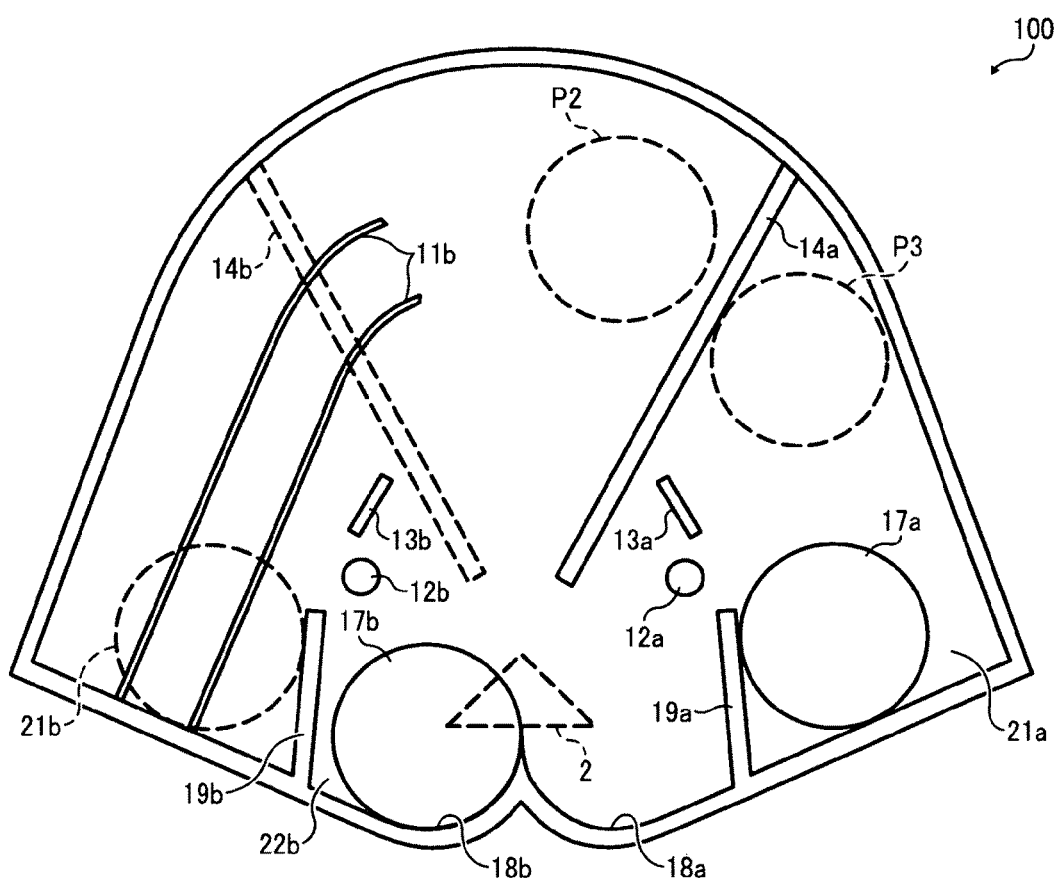
FIGS. 5A and 5B schematically illustrate operation of the impact detector shown in FIG. 2.
Figure 5B:
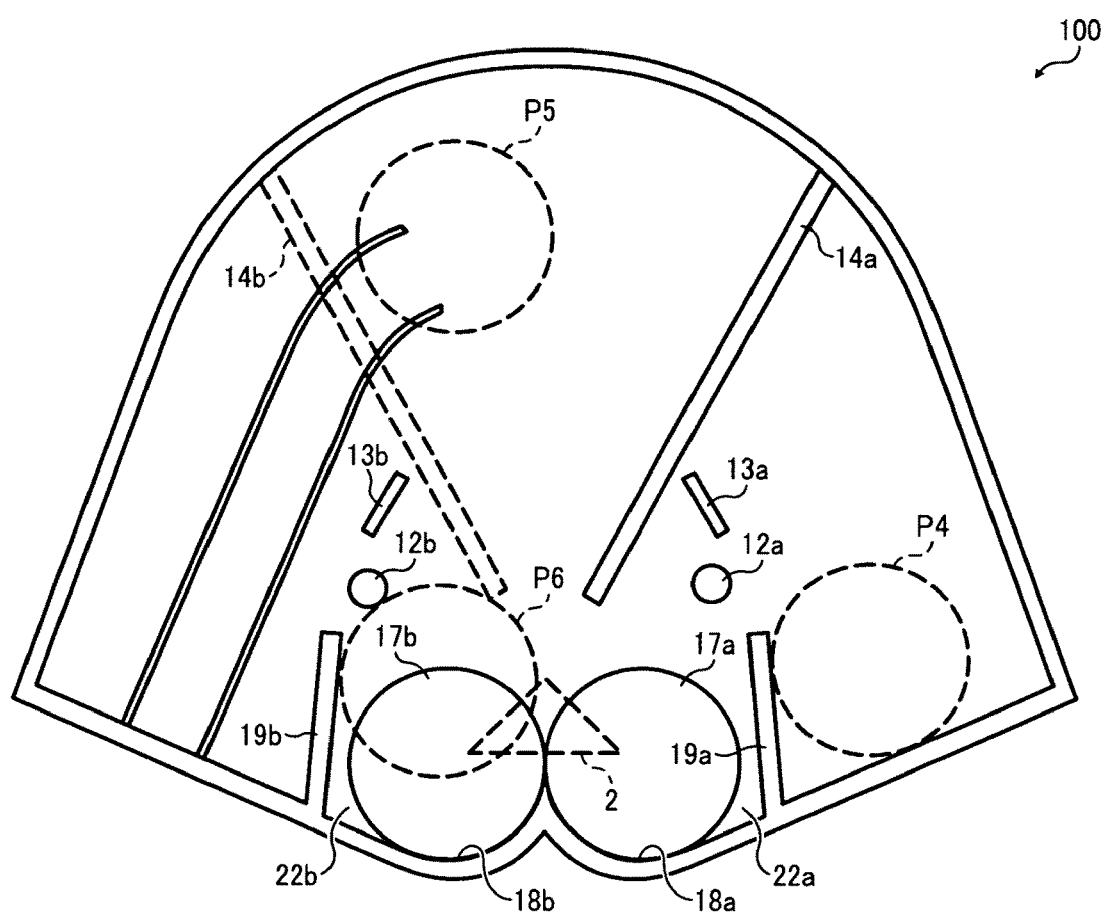

FIGS. 5A and 5B schematically illustrate operation of the impact detector 100.

Referring to FIG. 5A, the weight 17b is at the initial position 21b (shown in FIG. 2) as indicated by broken lines shown in FIG. 5A. From this state, when the impact detector 100 falls in the second direction to the side of the case body 10, that is, the back side of paper on which FIG. 5A is drawn, the weight 17b slides on the rails 11b, thus moving through the transition path 15b to a position P2 as indicated by broken lines FIG. 5A. Simultaneously, the weight 17a moves through the returns path 16a to a position P3 as indicated by broken lines FIG. 5A and then the regulation member 14a stops the weight 17a.

From this state, when the impact detector 100 reverts to the initial state, the weight 17b moves along the oblique surface of the regulation member 14a down in FIG. 5A and then is housed in the curved portion 18b, that is, positioned at the impact detection position 22b as indicated by a solid line in FIG. 5A. Additionally, the weight 17a is kept at the initial position 21a as indicated by a solid line shown in FIG. 5A. At that time, the weight 17b is positioned partly overlap the inspection window 2 on the plane along the surface of paper on which FIG. 5A is drawn and thus is visible through the inspection window 2. Therefore, the user can recognize that the impact detector 100 has a history of falling in the second direction to the case-body side.

Subsequently, when the impact detector 100 falls in the first direction, to the lid side, the boss 12b and the lower end portion of the regulation member 14*b* formed in the lid 1 prevents the weight 17*b* from moving upward in FIG. 5B, and thus the weight 17*b* is positioned at a position P6 indicated by broken lines shown in FIG. 5B. Simultaneously, the weight 17*a* slides on the rails 11*a* (shown in FIG. 1) formed in the lid 1, thus moving through the transition path 15*a* (shown in FIG. 2) to a position P5 indicated by broken lines shown in FIG. 5B.

From this state, when the impact detector 100 reverts to the initial state, the weight 17*b* moves down from the position P6 and then is housed in the curved portion 18*b*, that is, positioned at the impact detection position 22*b* as indicated by a solid line in FIG. 5B. Simultaneously, the weight 17*a* descend from the position P5 along the oblique surface of the regulation member 14*b* formed in the lid 1 and then is housed in the curved portion 18*a* as indicated by a solid line shown in FIG. 5B.

Herein, because the surfaces of the weights 17*a* and 17*b* are colored differently from other components, the user can recognize the weights 17*a* and 17*b* partly exposed through the inspection window 2. Thus, the impact detector 100 can indicate impact history of the impact detector 100 in both the first and second directions, to the case-body side and the side of the lid 1.

An impact detector 200 according to a second embodiment is described below.

Figure 6B:
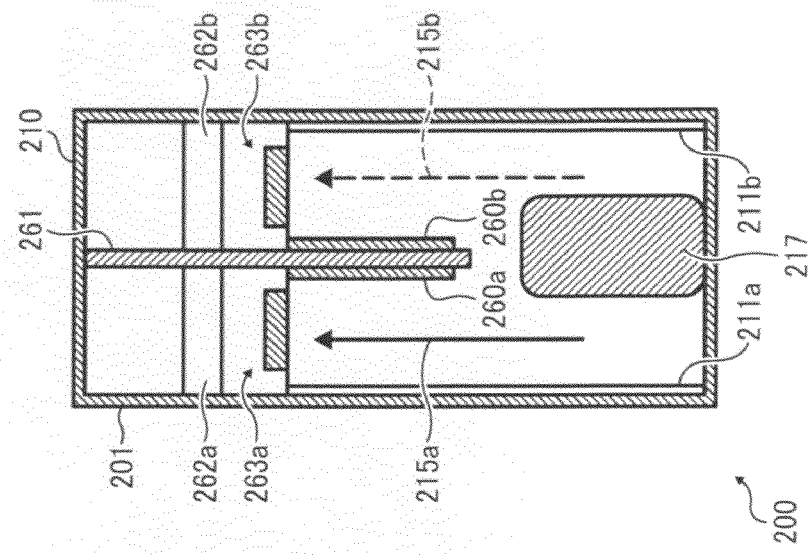
FIG. 6B is a cross-sectional view of the impact detector shown along line B-B shown in FIG. 6A.
Figure 6A:
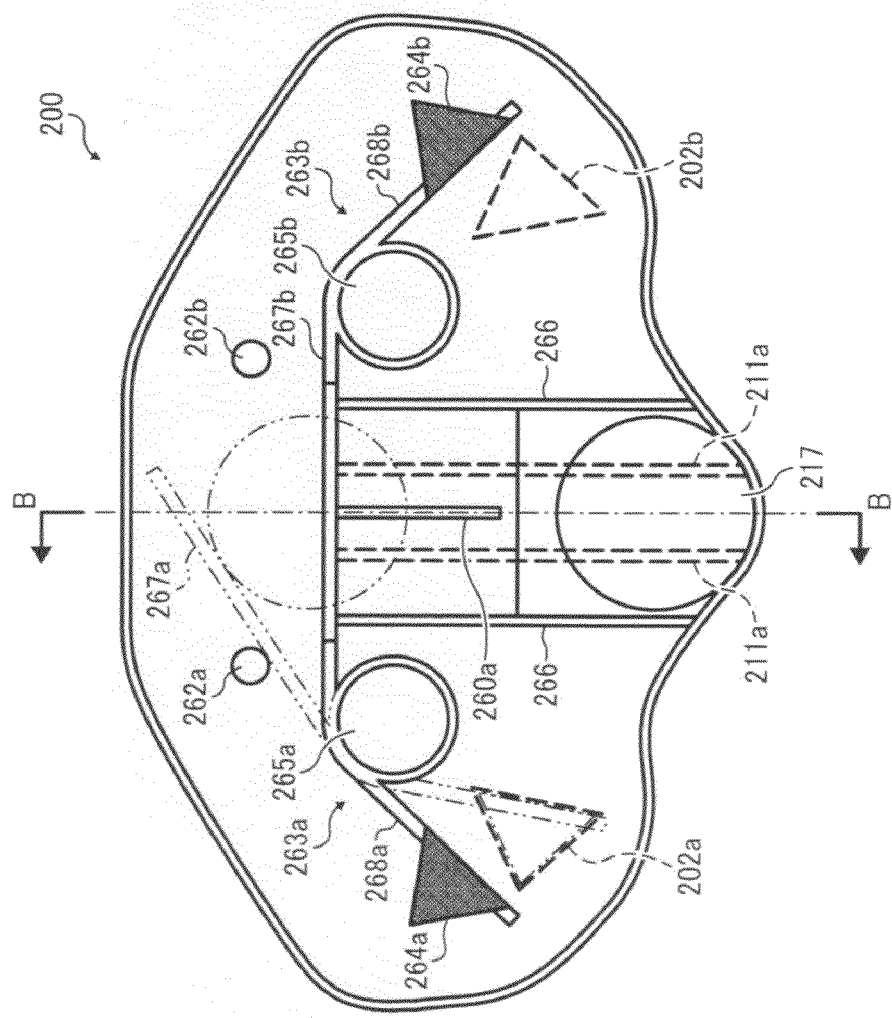
FIG. 6A illustrates a cross section from a front side of an impact detector according to another illustrative embodiment.

FIG. 6A is a cross-sectional view from a front side illustrating the impact detector 200. FIG. 6B illustrates a cross section of the impact detector 200 along a line B-B shown in FIG. 6A.

The impact detector 200 includes a lid 201 and a case body 210 to which the lid 201 is attached. The lid 201 and the case body 210 together form a case. As shown in FIG. 6B, the impact detector 200 includes a lid-side transition path 215*a*, serving as a first transition path, formed on the side of the lid 201 and a case-side transition path 215*b*, serving as a second transition path, formed on the side of the case body 210. The lid-side-transition path 215*a* and the case-side transition path 215*b* are adjacent to each other in a direction perpendicular to the surface of paper on which FIG. 6A is drawn. In FIG. 6B, the lid-side-transition path 215*a* and the case-side transition path 215*b* communicate with each other in a lower portion and are separated by an partition 261 from each other in an upper portion The impact detector 200 further includes only a single weight 217 movable through the lid-side-transition path 215*a* and the case-side transition path 215*b*. Additionally, a pair of side guide members 266 to guide the weight 217 is formed on both sides of the lid-side-transition path 215*a* and the case-side transition path 215*b* in FIG. 6A.

The impact detector 200 according to the present embodiment further includes pivotable members 263*a* and 363*b*, inspection windows 202*a* and 202*b*, serving as first and second indicators of the impact indicator, formed in the lid 201, and rails 211*a* to guide the weight 217 formed on an inner surface of the lid 201. In the present embodiment, when the impact detector 200 falls in a first direction to the side of the lid 201 or a second direction to the side of the case body 210, the weight 217 moves through the lid-side-transition path 215*a* or the case-side transition path 215*b* and then causes the pivotable member 263*a* or 263*b*, thereby indicating that the impact detector 200 has fallen in the inspection windows 202*a* or 202*b*.

The pivotable member 263*a* is pivotably supported by an axis 265*a* and positioned in the lid-side transition path 215*a* so that the weight 217 moving through the lid-side transition path 215*a* can contact a swing arm 267*a* (first, free end portion) of the pivotable member 263*a*. Similarly, the pivotable member 263*b* is swingably supported by an axis 265*b* and positioned in the case-side transition path 215*b* so that the weight 217 moving through the case-side transition path 215*b* can contact a swing arm 267*b* (first, free end portion) of the pivotable member 263*b*.

The pivotable members 263*a* and 263*b* further include driven arms 268*a* and 268*b* (second. free end portion) partly sandwiching the axes 265*a* and 265*b* with the swing arms 267*a* and 267*b*, respectively, and indication members 264*a* and 264*b* (e.g., a first flag and a second flag) are attached to the driven arms 268*a* and 268*b*, respectively.

When the weight 217 contacts and causes the swing arm 267*a* or 267*b* of the pivotable member 263*a* or 263*b* to swing, the indication member 264*a* or 264*b* overlaps the inspection window 202*a* or 202*b* on the front side of the impact detector 200. In FIG. 6A, the indication member 264*a* overlapping the inspection window 202*a* is indicated by broken lines.

Referring to FIG. 6B, guide members 260*a* and 206*b* are formed on both sides of the above-described partition 261 disposed between the lid-side-transition path 215*a* and the case-side transition path 215*b*. The guide member 260*a* guides a surface of the weight 217 moving through the lid-side transition path 215*a*, and the guide member 260*b* guides a surface of the weight 217 moving through the case-side transition path 215*b*.

Additionally, rails 211*b* to guide the weight 217 are formed on an inner surface of the case body 210.

The case body 210 further includes bosses 262*a* and 262*b* to restrict movement of the pivotable members 263*a* and 263*b* when the pivotable members 263*a* and 263*b* swing, respectively. The boss 262*a* is configured to prevent the weight 217 from deviating upward in FIGS. 6A and 6B from the lid-side transition path 215*a* when the pivotable member 263*a* (indication member 264*a*) is visible through the inspection window 202*a*, and the boss 262*b* is configured to prevent the weight 217 from deviating upward in FIGS. 6A and 6B from the case-side transition path 215*b* when the pivotable member 263*b* is visible through the inspection window 202*b*. Herein, the inspection windows 202*a* and 202*b* are respectively configured to engage the indication members 264*a* and 264*b* of the pivotable members 263*a* and 263*b* so that the pivotable members 263*a* and 263*b* do not revert to initial positions once the indication members 264*a* and 264*b* fit in the inspection windows 202*a* and 202*b*, respectively.

As described above, in the present embodiment, the impact detector 200 can indicate impact history of the impact detector 200 in the first direction (to the front side) and the second direction (to the back side) as well, and the impact indicator can maintain the impact indication state in the first direction with the indication member 264*a* and in the second direction with the indication member 264*b*. Additionally, the impact detector 200 according to the present embodiment can be more compact horizontally when viewed from the front side because the lid-side transition path 215*a* overlaps the case-side transition path 215*b*.

An impact detector according to a third embodiment is described below.

Figure 7A:
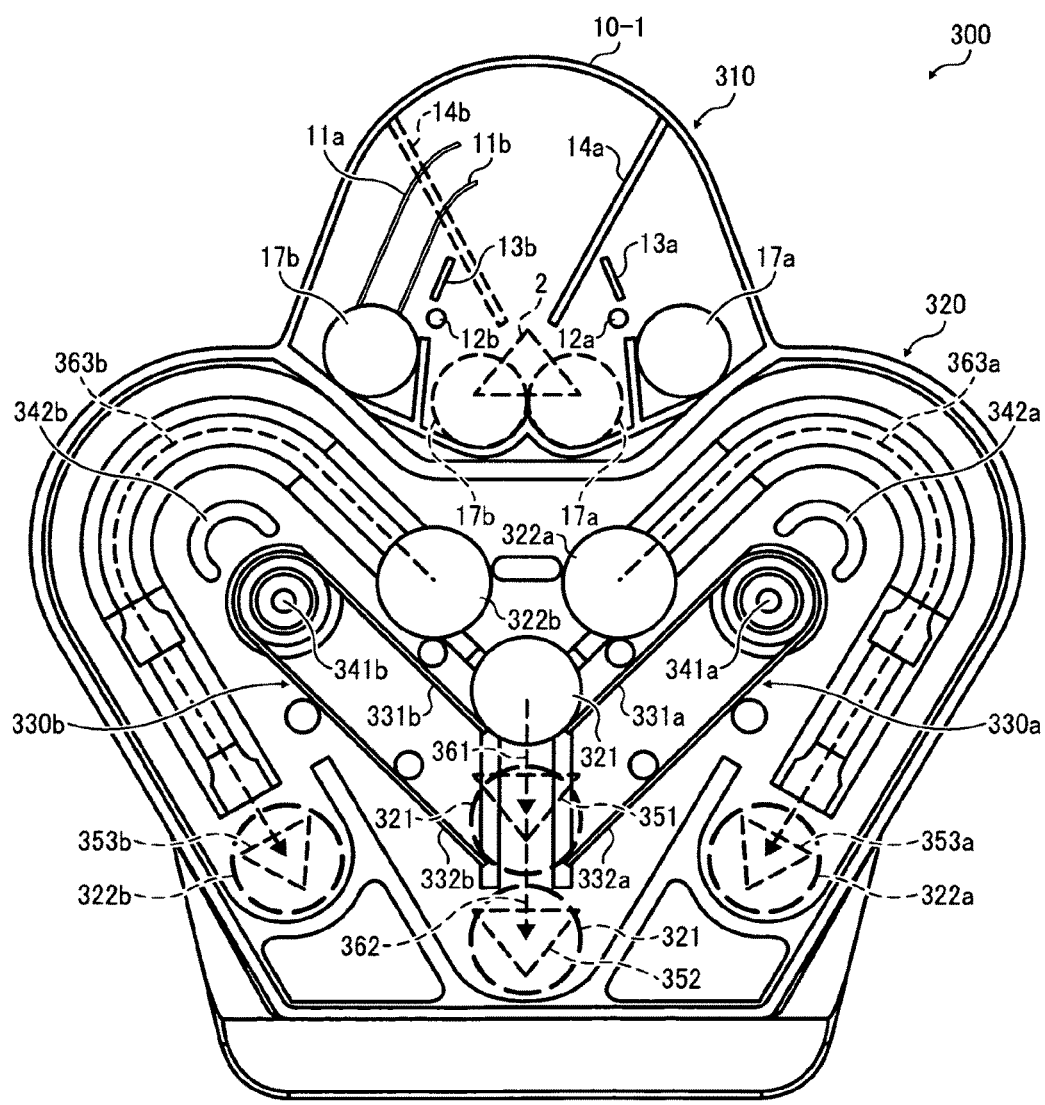
FIG. 7A is a cross-sectional view illustrating an impact detector according to another illustrative embodiment from a front side.
Figure 7B:
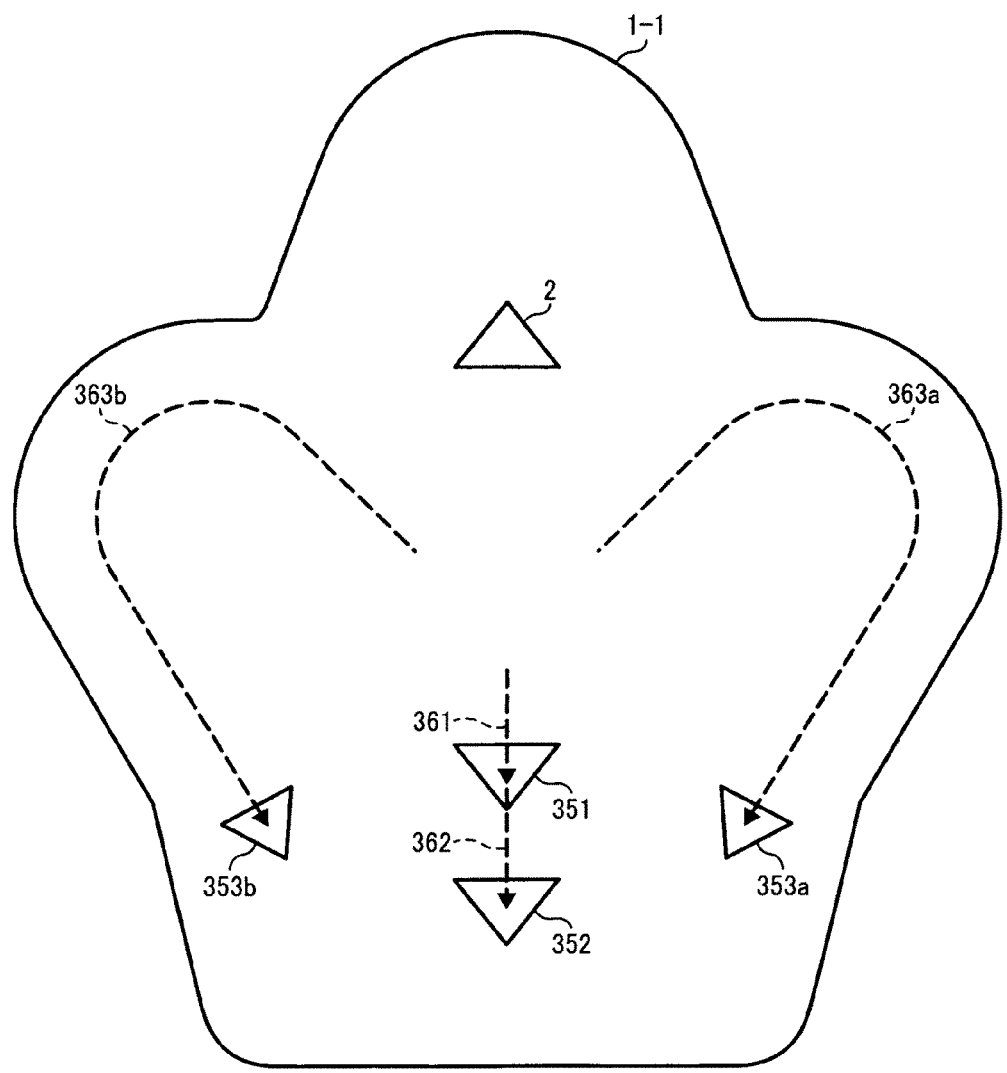
FIG. 7B illustrates a lid of the impact detector shown in FIG. 7A

FIG. 7A is a cross-sectional view from a front side illustrating an impact detector 300 according the third embodiment, and FIG. 7B illustrates a lid of the impact detector shown in FIG. 7A.

The impact detector 300 according to the present embodiment includes an anteroposterior impact detector 310 to indicate impact history in an anteroposterior direction and an impact detector 320 to indicate impact history in a lateral direction as well as drop history, that is, history of impact from below in FIG. 7A. The anteroposterior impact detector 310 is attached to an upper portion of the impact detector 320.

The anteroposterior impact detector 310 has a configuration similar to that of the impact detector 100 shown in FIGS. 1 through 5B according to the first embodiment, and components identical or similar to those of the impact detector 100 are given identical reference characters. Thus, descriptions of the anteroposterior impact detector 310 are omitted. With the configuration, the impact history in the four different directions, that is, to the front side, the back side, the right side, and the left side can be indicated with a single weight, and thus the impact detector can be relatively simple.

The impact detector 320 can indicate how may times the impact detector 300 has been dropped, that is, has received impact from below, up to twice and impact history of the impact detector 300 in the lateral direction (lateral falling history), that is, whether or not the impact detector 300 has tilted laterally to a certain degree. Case bodies of the impact detector 320 and the anteroposterior impact detector 310 are united together, forming a case body 10-1, and lids of them are united together, forming a lid 1-1 configured to engage the case body 10-1.

A weight 321, serving as a fifth weight, to detect drop of the impact detector 300 and weights 322a and 322b, respectively serving as third and fourth weights, to detect falling of the impact detector 300 in the lateral direction are provided in the case body 10-2 of the impact detector 320.

In the present embodiment, the weight 321 is supported by a right planar member 330a (third guide member) and a left planar member 330b (fourth guide member) and detect how many times the impact detector 300 has fallen down up to twice. The right planar member 330a includes a first retaining member 331a disposed on an upper side and a second retaining member 332a disposed on a lower side, connected together. Similarly, the left planar member 330b includes a first retaining member 331b disposed on an upper side and a second retaining member 332b disposed on a lower side, connected together. The right planar member 330a and the left planar member 330b are held by a supporters 341a on the right and a supporter 341b on the left in FIG. 7A. In the present embodiment, each of the right planar member 330a and the left planar member 330b is a single elastic thin plate made of stainless, steel, for example, that is lateral U-shaped substantially.

In an initial state, the weight 321 is supported on both sides by the first retaining members 331a and 331b of the right planar member 330a and the left planar member 330b as indicated by a solid line shown in FIG. 7A. When the impact detector 300 receives impact from an initial drop from the initial state, the weight 321 descends along a vertical transition path 361 (fifth transition path), pushing away the first retaining members 331a and 331b and then is held by the second retaining members 332a and 332b of the right planar member 330a and the left planar member 330b as indicated by bold broken lines shown in FIG. 7A. At that time, the weight 321 is visible through an inspection window 351 (fifth indicator) formed in the lid 1-2. When the impact detector 300 receives impact from a second drop, the weight 321 further descends along a vertical transition path 362, pushing away the second retaining members 332a and 332b and then is visible through an inspection window 352 (fifth indicator) formed in the lid 1-2 as indicated by bold broken lines shown in FIG. 7A. Thus, the impact detector 300 can indicates the drop history of two drops.

When the impact detector 300 tilts to the right in FIG. 7A, the weights 322a rotates on the first retaining member 331a and on upper side of a guide member 342a and thus moves from an initial position indicated by a solid line shown in FIG. 7A along a right transition path 363a serving as a third transition path to a position indicated by bold broken lines shown in FIG. 7A. At that time, the weight 332a is visible through an inspection window 353a (third indicator) formed in the lid 1-2. By contrast, when the impact detector 300 tilts to the left in FIG. 7A, the weights 322b rotates on the first retaining member 331b and on upper side of a guide member 342b and thus moves from an initial position indicated by a solid line shown in FIG. 7A along a left transition path 363b serving as a fourth transition path to a position indicated by bold broken lines shown in FIG. 7A. At that time, the weight 322b is visible through an inspection window 353b (fourth indicator) formed in the lid 1-2. Thus, the impact detector 300 can indicates the lateral impact history.

Therefore, in the impact detector 300 according to the present embodiment, the anteroposterior impact detector 310 can indicate the anteroposterior impact history, that is, in the first direction (to the front side) and the second direction (to the back side), and the impact detector 320 can indicate lateral impact history as well as the first drop and the second drop.

An impact detector according to a fourth embodiment is described below.

Figure 8A:
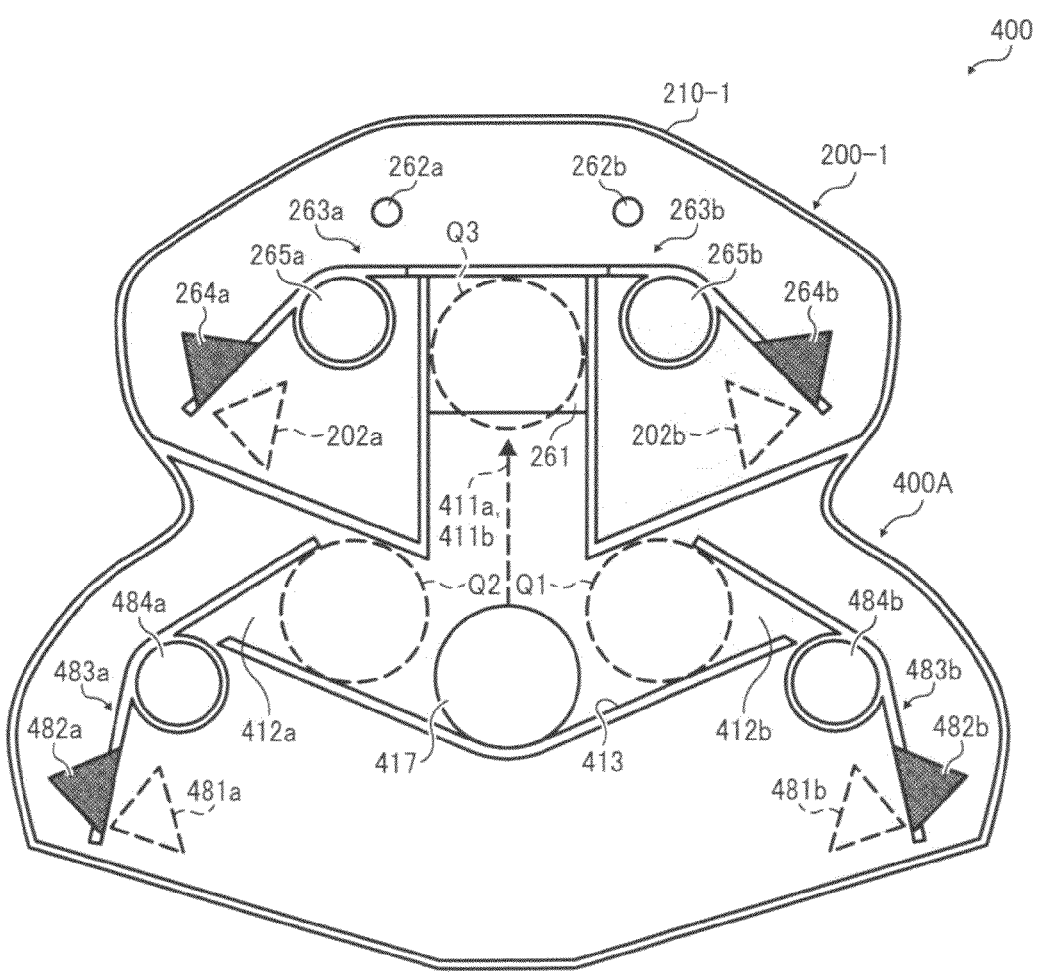
FIG. 8A is a cross-sectional view illustrating an impact detector according to another illustrative embodiment from a front side.
Figure 8B:
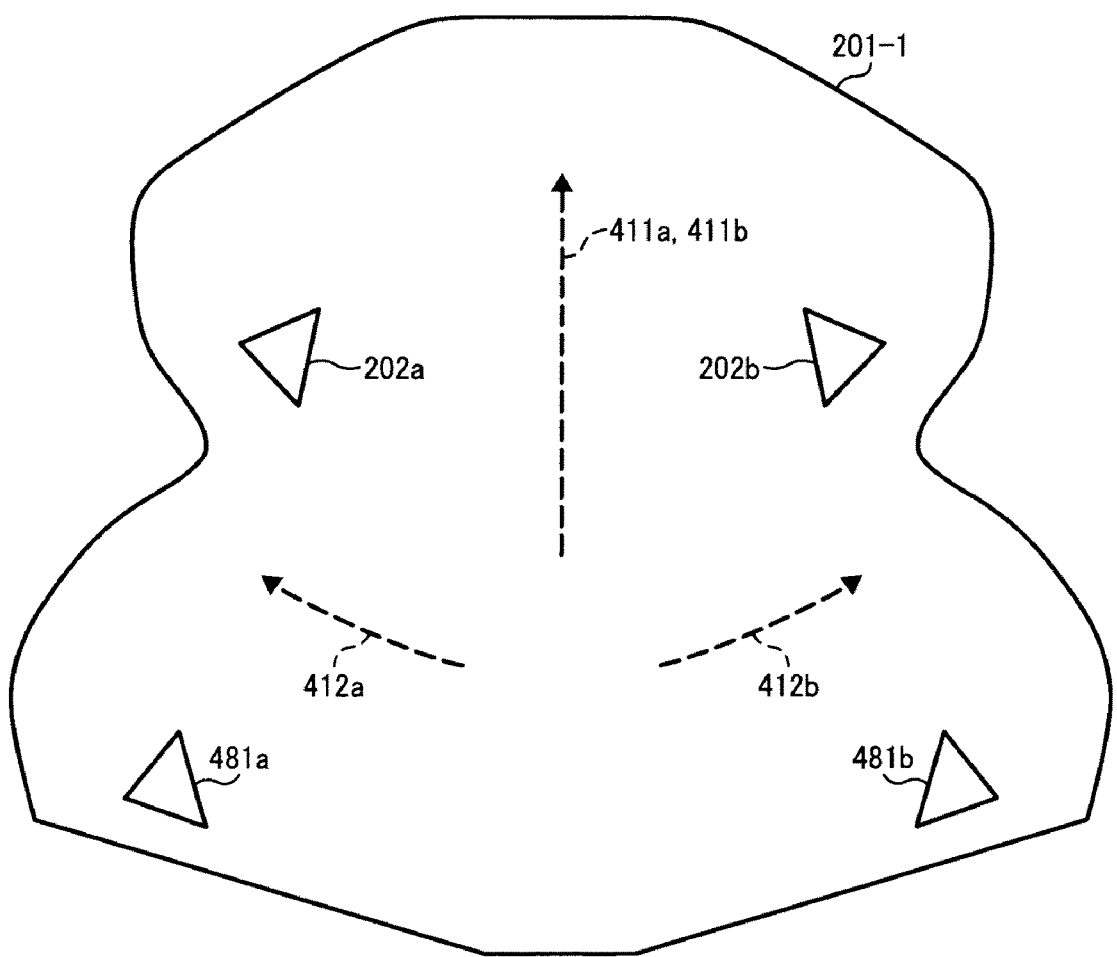
FIG. 8B illustrates a lid of the impact detector shown in FIG. 8A.

FIG. 8A is a cross-sectional view illustrating an impact detector 400 according to the fourth embodiment from a front side, and FIG. 8B illustrates a lid of the impact detector 400.

The impact detector 400 according to the present embodiment includes an anteroposterior impact detector (upper detection unit) 200-1 to detect anteroposterior impact history and an impact detector (lower detection unit) 400A to detect lateral falling, disposed beneath the impact detector 200-1.

The anteroposterior impact detector 200-1 has a configuration similar to that of the impact detector 200 shown in FIGS. 6A and 6B according to the second embodiment, and components identical or similar to those of the impact detector 200 are given identical reference characters. Thus, descriptions of the anteroposterior impact detector 200-1 are omitted.

In the configuration shown in FIGS. 8A and 8B, the impact detector 400 includes only a single weight 417, and a transition path through which the weight 417 moves is formed continuously in the upper detection unit 200-1 and the lower detection unit 400A. In the present embodiment, the single weight 417 is used to indicate impact history in both an anteroposterior direction and a lateral direction. More specifically, referring to FIG. 8A, the impact detector includes pivotable members 483a and 483b (e.g., third and fourth pivotable members) pivotably attached to swing axes 484a and 484b, respectively, and indication members 482a and 482b (e.g., third and fourth flags) are attached to lower portions of the pivotable members 483a and 483b, respectively. The impact includes a lid 201-1 shown in FIG. 8B and a case body 210-1 to which the lid 201-1 is attached, and the partition 261 extends in only the upper detection unit 200-1. Inspection windows 202a, 202b, 481a, and 481b are formed in the lid 201-1.

Next, movement of the weight 417 when the impact detector 400 falls to the anteroposterior direction, that is, to the back side and to the front side and in the lateral direction, that is, to the right and left, in FIG. 8A is described below.

In an initial state in which the impact detector 400 does not have a history of falling to any of the back side, the front side, the right side, and the left side, the weight 417 is positioned at the position indicated by a solid line shown in FIG. 8A (initial position).

When the impact detector 400 falls to the front side, that is, upward from the surface of paper on which FIG. 8A is drawn, the weight 417 moves upward in FIG. 8A through a lid-side transition path 411a (first transition path) shown in FIG. 8B, guided by the rails 211a shown in FIGS. 6A and 6B. When the weight 417 moves above a position Q3 indicated by broken line shown in FIG. 8A, the weight 417 contacts the pivotable member 263a (first pivotable member).

At this time, the pivotable member 263a pivots on the axis 265a counterclockwise, and then the indication member 264a fits in the inspection window 202a.

Thus, the indication member 264a is visible through the inspection window 202a, and the user can recognize that the impact detector 400 has fallen to the front side, to the side of the lid 201-1.

Subsequently, although the indication member 264a remains fitted in the inspection window 202a, the weight 417 returns to the initial position indicated by the solid line shown in FIG. 8A when the impact detector 400 reverts to the initial state.

When the impact detector 400 falls to the back side, that is, downward from the surface of paper on which FIG. 8A is drawn, the weight 417 moves upward in FIG. 8A through a case-side transition path 411b (second transition path), guided by the rails 211b shown in FIGS. 6A and 6B. When the weight 417 moves above the position Q3 shown in FIG. 8A, the pivotable member 263b (second pivotable member) pivots on the axis 265b counterclockwise, and thus the indication member 264b fits in the inspection window 202b. Thus, the indication member 264b is visible through the inspection window 202b, and the user can recognize that the impact detector 400 has fallen to the back side, to the side of the case body 210-1.

It is to be noted that, although the indication member 264b is kept fitted in the inspection window 202b, the weight 417 returns to the initial position indicated by the solid line shown in FIG. 8A when the impact detector 400 reverts to the initial state.

When the impact detector 400 falls to the left (e.g., third direction) in FIG. 8A, the weight 417 moves to the left in FIG. 8A through a case-side transition path 412a (third transition path), guided by a left portion of a guide surface 413 in the case body 210-1. When the weight 417 has passed a position Q2 indicated by broken lines shown in FIG. 8A, the weight 417 contacts the pivotable member 483a, causing the pivotable member 483a to pivot on the axis 484a counterclockwise, and thus the indication member 482a fits in the inspection window 481a (third indicator of the impact indicator). Thus, the indication member 482a is visible through the inspection window 482a, and the user can recognize that the impact detector 400 has fallen to the left in FIG. 8A.

It is to be noted that, although the indication member 482a is kept fitted in the inspection window 481a, the weight 417 returns to the initial position indicated by the solid line shown in FIG. 8A when the impact detector 400 reverts to the initial state.

When the impact detector 400 falls to the right (fourth direction) in FIG. 8A, the weight 417 moves to the right in FIG. 8A through a case-side transition path 412b (fourth transition path), guided by a right portion of the guide surface 413. When the weight 417 has passed a position Q1 indicated by broken lines shown in FIG. 8A, the pivotable member 483b pivots on the axis 484b clockwise, and thus the indication member 482b fits in the inspection window 481b (fourth indicator of the impact indicator). Thus, the indication member 482b is visible through the inspection window 481b, and the user can recognize that the impact detector 400 has fallen to the right in FIG. 8A.

It is to be noted that, although the indication member 482b is kept fitted in the inspection window 481b, the weight 417 returns to the initial position indicated by the solid line shown in FIG. 8A when the impact detector 400 reverts to the initial state.

With the configuration described above, the impact detector 400 according to the present embodiment can indicate the falling history to the front side, the back side, the right side, and the left side with a single weight, and the inspection windows 202a, 202b, 481a, and 481b can maintain the impact indication state in the first, second, third, and fourth direction, respectively. Thus, the impact detector 400 can be simpler than the impact detector 300 according to the third embodiment.

It is to be noted that, the configurations of the above-described various embodiments can be combined freely. For example, the impact detector 100 shown in FIGS. 1 through 5B according to the first embodiment can be incorporated in the impact detector 400 shown in FIG. 8A according to the fourth embodiment instead of the impact detector 200 shown in FIGS. 6A and 6B according to the second embodiment. Alternatively, the impact detector 200 shown in FIGS. 6A and 6B according to the second embodiment can be incorporated in the impact detector 300 shown in FIG. 7A according to the third embodiment instead of the impact detector 100 shown in FIGS. 1 through 5B according to the first embodiment.

An impact detector according to a fifth embodiment is described below.

Figure 9:
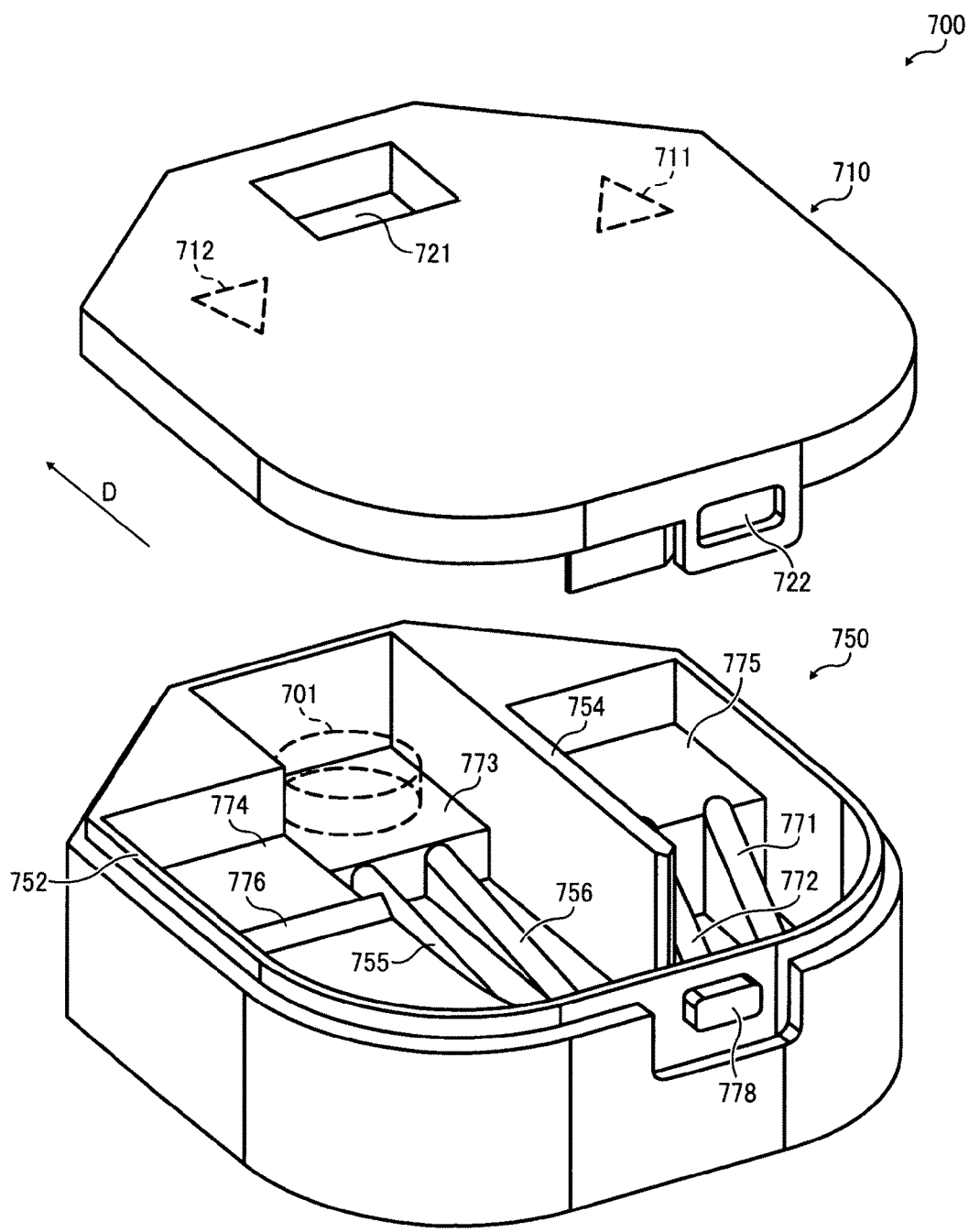
FIG. 9 is an exploded perspective view illustrating an impact detector according to another illustrative embodiment.
Figure 10:
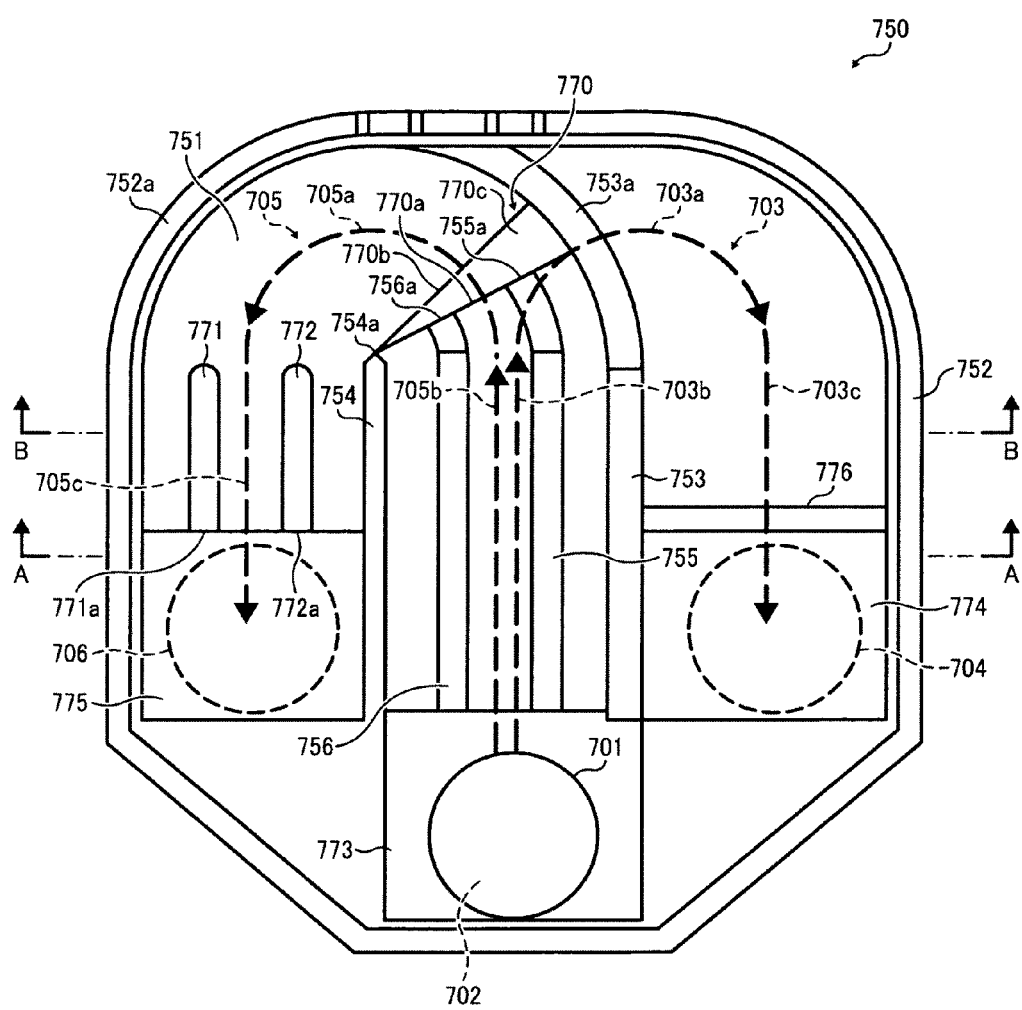
FIG. 10 is a plan view illustrating a case body of the impact detector shown in FIG. 9.
Figure 11:
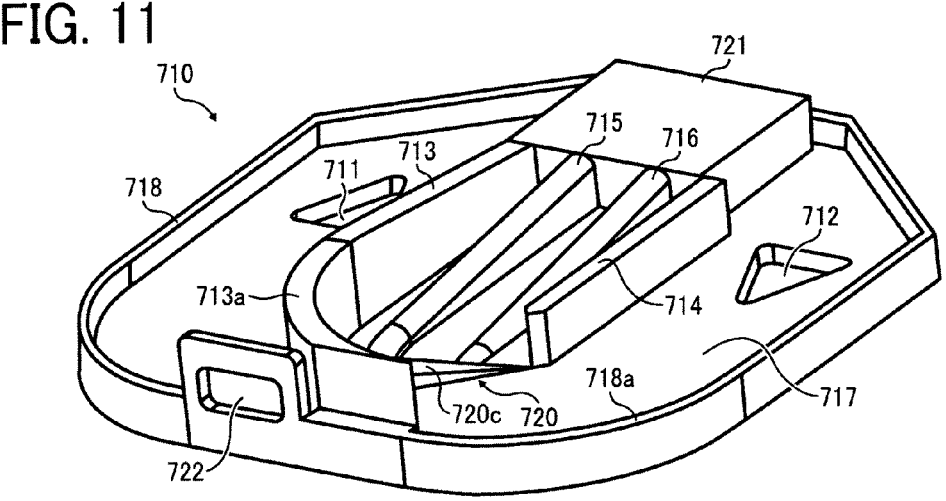
FIG. 11 is a perspective view illustrating a lid of the impact detector shown in FIG. 9.
Figure 12:
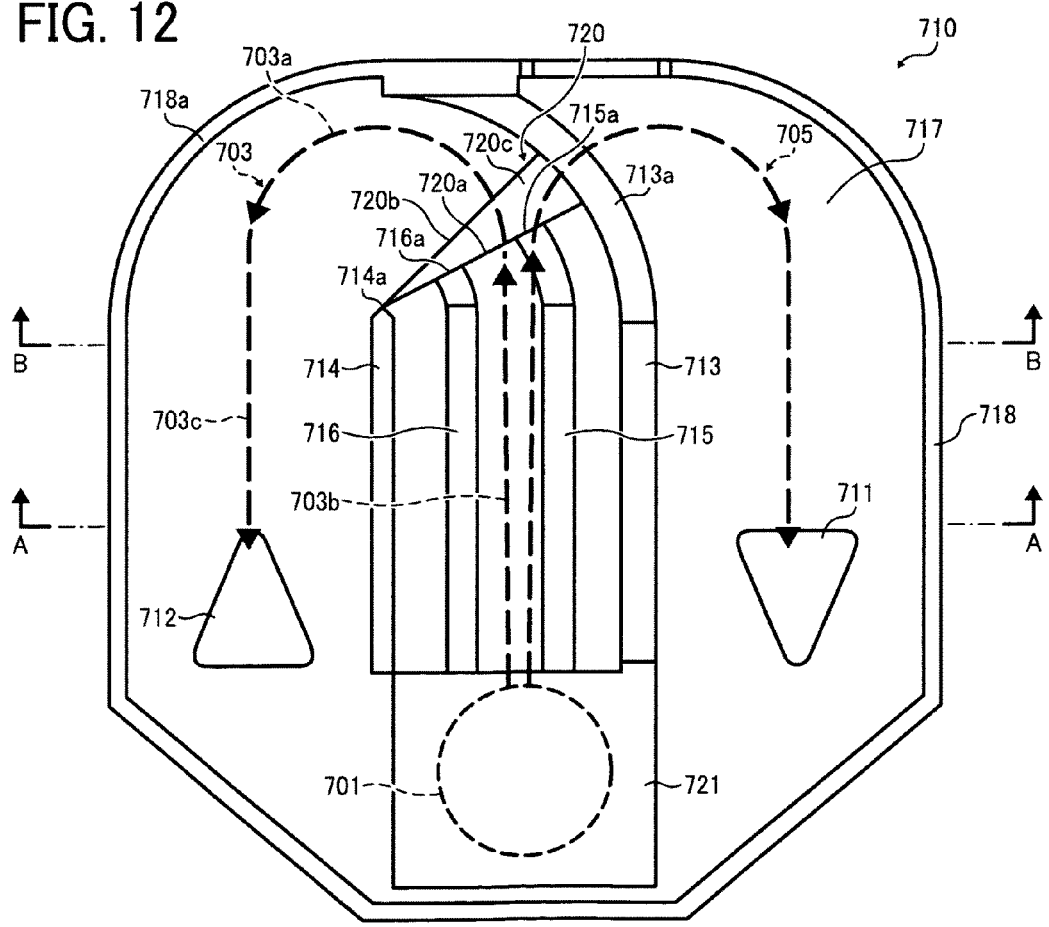
FIG. 12 is a plan view illustrating a lid of the impact detector shown in FIG. 9.
Figure 13:
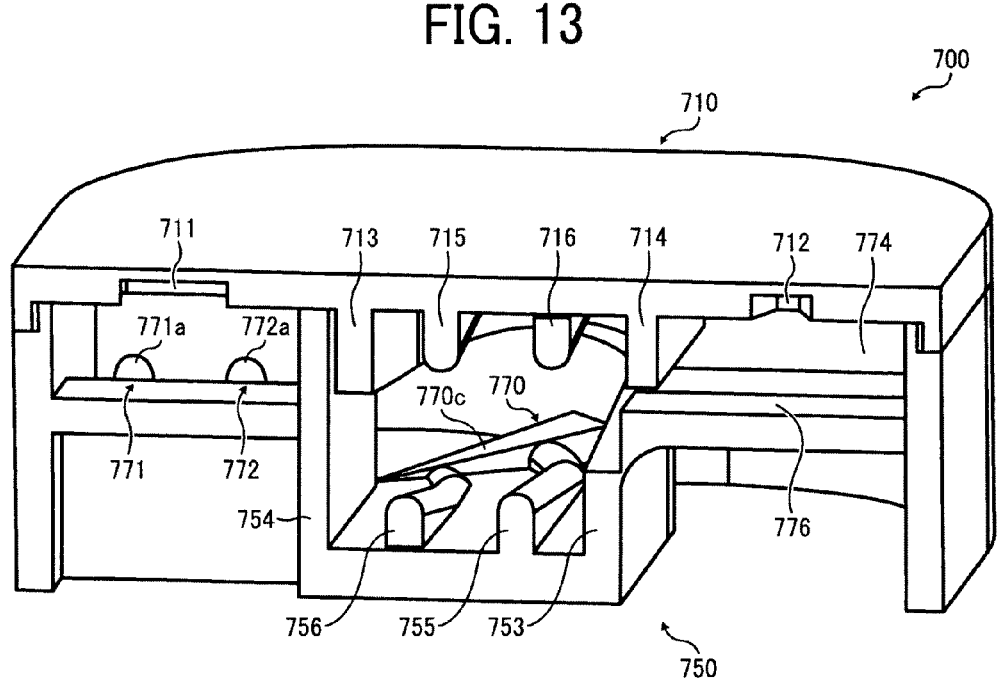
FIG. 13 is a perspective view illustrating a cross section of the impact detector along a line A-A shown in FIG. 10.
Figure 14:
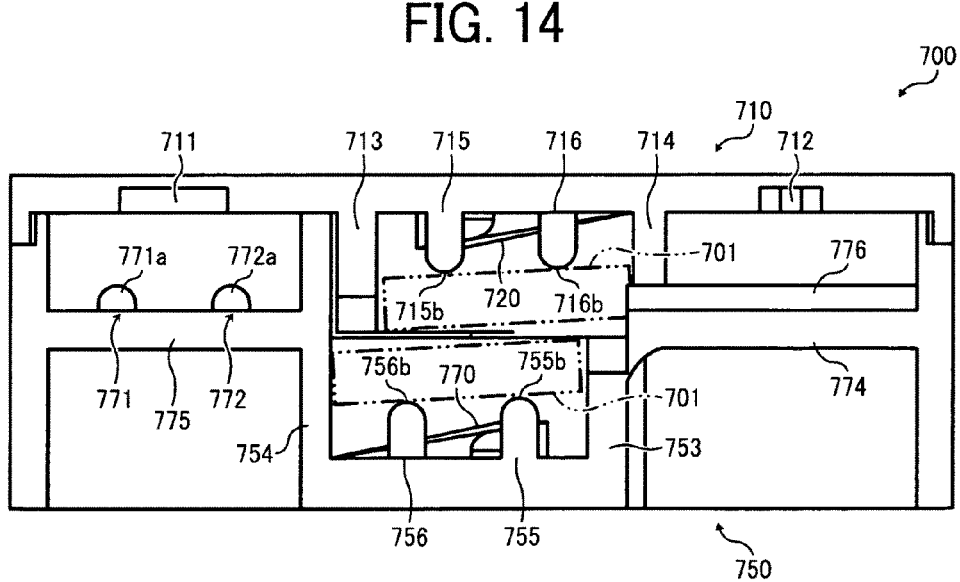
FIG. 14 illustrates a cross section of the impact detector along the line A-A shown in FIGS. 10 and 12.
Figure 15:
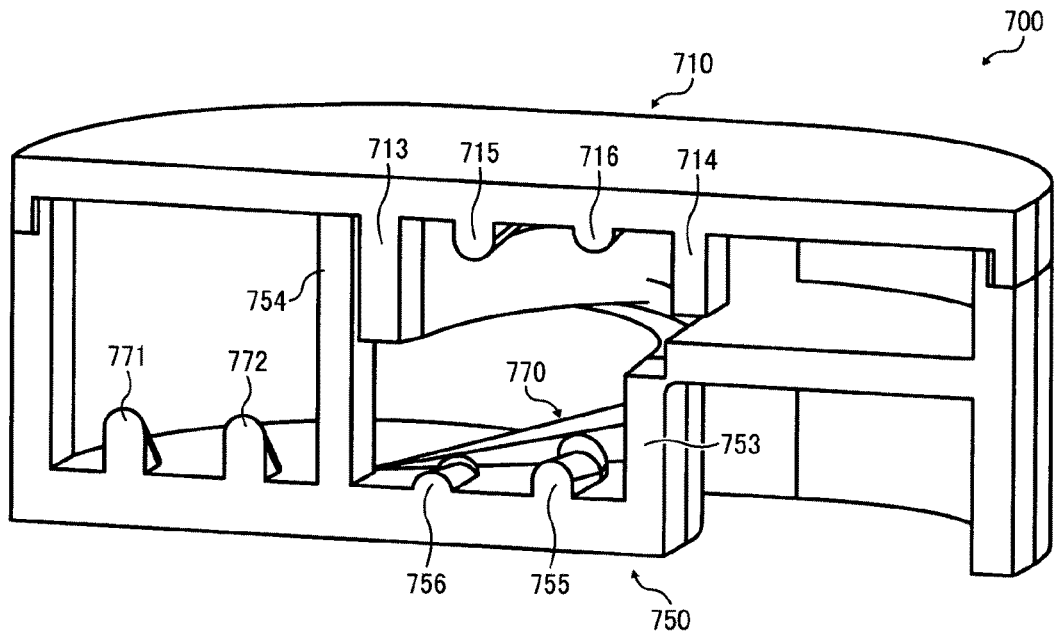
FIG. 15 is a perspective view illustrating a cross section of the impact detector along a line B-B shown in FIGS. 10 and 12.
Figure 16:
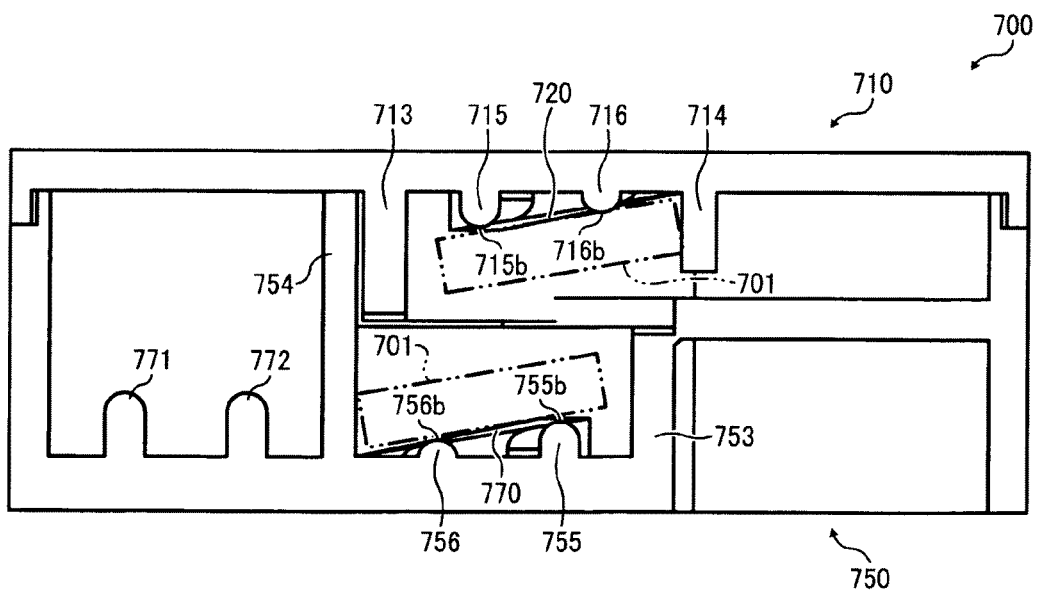
FIG. 16 illustrates a cross section of the impact detector along the line B-B shown in FIGS. 10 and 12.

FIG. 9 is an exploded perspective view illustrating an impact detector 700 according to the fifth embodiment, and FIG. 10 is a plan view from a front side illustrating a case body 750 of the impact detector 700 shown in FIG. 9. FIGS. 11 and 12 are a perspective view and a plan view illustrating a lid 710 of the impact detector 700 shown in FIG. 9, respectively. FIGS. 13 and 14 are a perspective view and a cross sectional view illustrating a cross section of the impact detector 700 along a line A-A shown in FIG. 10, respectively. FIGS. 15 and 16 are a perspective view and a cross sectional view illustrating a cross section of the impact detector along a line B-B shown in FIGS. 10 and 12, respectively.

Referring to FIG. 9, the impact detector 700 includes a lid 710, the case body 750 configured to engage the lid 710, and a weight 701, serving as a first weight, disposed inside the case body 750. In the present embodiment, the weight 701 is an aluminum column (e.g., tablet) and may be colored. The impact detector 700 includes a lid-side transition path 703, serving as a first transition path, formed on the side of the lid 710 and a case-side transition path 705, serving as a second transition path, formed on the side of the case body 750. The weight 702 moves through the lid-side-transition path 703 and the case-side transition path 705, which are indicated by bold broken lines on the right and the left in FIG. 10 and formed between the lid 710 and the case body 750. As shown in FIG. 10, the impact detector 700 stands with the direction indicated by arrow D shown in FIG. 9 downward in an initial state. When the impact detector 700 falls in the first direction to the side of the lid 710, the weight 701 moves from an initial position 702 indicated by a solid line in FIG. 10 through the lid-side transition path 703 (first transition path) to a lid-side impact detection position 704 in a weight receiving portion 774 disposed on the right in FIG. 10. Even after the impact detector 700 reverts to the initial state, the weight 701 remains at the impact detection position 704 and can be observed through an inspection window 712 (first indicator) formed in the lid 710, facing the weight receiving portion 774. The lid-side transition path 703 includes a linear path 703b (linear portion) leading from the initial position 702, a bent path 703a (bent portion) arcing from the linear path 703b, and a linear path 703c leading from the bent path 703a toward the lid-side impact detection position 704.

Similarly, when the impact detector 700 falls in the second direction to the side of the case body 750 from the initial standing state shown in FIG. 10, the weight 701 moves from the initial position 702 through the case-side transition path 705 to a case-side impact detection position 706 in a weight receiving portion 775 disposed on the left in FIG. 10. Even after the impact detector 700 reverts to the initial state, the weight 701 remains at the case-side impact detection position 706 and can be observed through an inspection window 711 (second indicator) formed in the lid 710, facing the weight receiving portion 775. That is, the impact detector 700 indicates that the impact detector 700 has fallen to the side of the lid 710 when the weight 701 is visible through the inspection window 701 and that the impact detector 700 has fallen to the side of the case body 750 when the weight 701 is visible through the inspection window 711.

The case-side transition path 705 includes a linear path 705b (linear portion) leading from the initial position 701, a bent path 705a (bent portion) arcing from the linear path 705b, and a linear path 705c leading from the bent path 705a toward the case-side impact detection position 706. Additionally, in the present embodiment, the linear path 703b of the lid-side transition path 703 and the linear path 705b of the case-side transition path 705 overlap with each other on a projection plane in parallel the front side. To show these paths clearly, the lid-side transition path 703 and the case-side transition path 705 are illustrated in FIG. 12, which is a plan view of the lid 710.

Next, the lid 710 is described in further detail below.

For example, the lid 710 can be formed with a synthetic resin and may be transparent. As shown in FIGS. 11 and 12, the lid 710 includes a planar body 717 and a wall 718 projecting from an edge portion of the planar body 717 to surround the planar body 717. Additionally, the planar body 717 includes thinner portions forming the inspection windows 711 and 712 that in the present embodiment are triangular and wall portions 713 and 714 standing on a back side or inner side of the planar body 717 facing the case body 750. The wall portions 713 and 714 together form the lid-side transition path 703 and serve as transition path limiter. Additionally, rails 715 and 716, serving as multiple projections, to guide the weight 701 are formed inside the wall portions 713 and 714 on the back side of the planar body 701. The lid-side transition path 703 is enclosed by the curved wall 718 together with the wall portions 713 and 714 and is formed in the case body 750. Herein, the wall portion 713 includes a curved end portion 713a disposed in an upper portion in FIG. 12, and the wall 718 includes an arced portion 718a disposed in an upper portion in FIG. 12. The bent path 703a is formed between the curved end portion 713a of the wall portion 713 and the arced portion 718a of the wall 718, and the linear path 703b is formed between the wall portions 713 and 714.

Additionally, a recess 721 recessed from an outer side of the lid 710 toward the case body 750 is formed in the planar body 717 of the lid 710. The recess 721 is disposed facing a convexity 773 shown in FIG. 10 in which the initial position 702 of the weight 701 is positioned. A distance between the recess 721 and the convexity 773 is set to prevent the weight 701 at the initial position 702 from moving significantly between the lid 710 and case body 750. It is to be noted that, in FIG. 11, reference numbers 722 represents an engagement hole formed in the lid 710, and 788 represents an engagement projection formed in the case body 750, to engage the engagement hole 722.

In the present embodiment, the rail 715 (outer projection) disposed on an outer circumference of the bent path 703a has a height greater than a height of the rail 716 (inner projection) disposed on an inner circumference of the bent path 703a. Further, as shown in FIGS. 14 and 16, the heights of the rails 715 and 716 are set so that highest end portions 715b and 716b (edge portion) of the rails 715 and 716 facing the case body 750 can contact the weight 701 that is in contact with the wall portion 714 (transition path limiter) disposed on the inner circumferential side the bent path 703a. This configuration provides a slope to the weight 701 moving though the lid-side transition path 703, thus attaining smooth movement of the weight 701 as well as reduction in the thickness (anteroposterior length) of the impact detector 700.

Additionally, as shown in FIG. 12, a deltaic or fan-shaped weight guide 720 is formed above upper end portions 715a and 716a of the rails 715 and 716. The weight guide 720 has an edge portion 720a on the side of the rails 715 and 716, and a height of the edge portion 720a is identical or similar to the height of the upper end portions 715a and 716a of the rails 715 and 716. By contrast, an edge portion 720b of the weight guide 720 on the side opposite the rails 715 and 716 includes steps descending toward inside the weight guide 720 between a highest portion of the flange edge 720b and the planar body 717. As shown in FIG. 11, the weight guide 720 further includes a sloped portion 720c disposed between the edge portions 720a and the 720b. A height of the sloped portion 720c decreases toward an apex 714a of the wall portion 714 and is identical or similar to the height of the planar body 717 where the sloped portion 720c contacts the apex 714a of the wall portion 714. With this configuration, the weight guide 720 can guide the weight 401 smoothly from the linear path 703b to the bent path 703a as well as prevent the weight 401 from moving back from the bent path 703 to the linear path 703b.

Additionally, in the present embodiment, the wall portion 714 serves as the transition path limiter and the apex 714a of the wall portion 714 is its leading edge portion in a direction in which the weight 701 moves from the initial position 702 to the lid-side impact detection position 704. The apex 714a is positioned at a downstream edge of the weight guide 720 in the weight moving direction from the initial position 702 to the lid-side impact detection position 704, that is, on an extension line of the edge portion 720b of the weight guide 701. With this configuration, the weight 701 can move through the bent path 703a reliably when the impact detector 700 detects an impact, that is, a container to which the impact detector 700 is attached falls, and the weight 701 can move to the inspection window 712 when the container recovers an initial position.

Next, the case body 750 is described in further detail below.

For example, the case body 750 can be formed with a synthetic resin and is colored in the present embodiment. As shown in FIGS. 9 and 10, the case body 750 includes a planar body 751 and a wall 752 projecting from an edge portion of the planar body 751 to surround the planar body 751. Additionally, the planar body 751 includes wall portions 753 and 754 standing on an inner side of the planar body 751 facing the lid 710. The wall portions 753 and 754 together form the case-side transition path 705 and serve as transition path limiter. The back side of the planar body 751, further includes rails 755 and 756, serving as multiple projections to guide the weight 701, formed inside the wall portions 753 and 754. The case-side transition path 705 is enclosed by an arced portion 752a of the wall 752 together with the wall portions 753 and 754 and is formed in the case body 750. Herein, the wall portion 753 includes a curved end portion 753a disposed in an upper portion in FIG. 10. The bent path 705a is formed between the curved end portion 753a of the wall portion 753 and the arced portion 752a of the wall 752, and the linear path 705b is formed between the wall portions 753 and 754. Additionally, the convexity 773 projecting toward of the lid 710 is formed in the planar body 751 of the case body 750, and the convexity 773 corresponds to the initial position 702 of the weight 701.

In the present embodiment, the rail 755 (outer projection) disposed on an outer circumference of the bent path 705a has a height greater than a height of the rail 756 (inner projection) disposed on an inner circumference of the bent path 705a. Further, as shown in FIGS. 14 and 16, heights of the rails 755 and 766 are set so that highest end portions 755b and 756b (edge portion) of the rails 755 and 756 facing the lid 710 can contact the weight 701 that is in contact with the wall portion 754 disposed on the inner circumference of the bent path 705a. This configuration provides a slope to the weight 701 moving though the case-side transition path 705, thus attaining smooth movement of the weight 701 as well as reduction in the thickness (anteroposterior length) of the impact detector 700.

Additionally, a deltaic or fan-shaped weight guide 770 is formed above upper end portions 755a and 756a of the rails 755 and 756 in FIG. 10. The weight guide 770 has an edge portion 720a on the side of the rails 755 and 756, and a height of the edge portion 720a is identical or similar to the height of the upper end portions 755a and 756a of the rails 755 and 756. By contrast, an edge portion 720b of the weight guide 770 on the side opposite the rails 755 and 756 includes steps descending toward inside the weight guide 770 between a highest portion of the flange edge 770b and the planar body 751. The weight guide 770 further includes a sloped portion 770c disposed between the edge portions 720a and 770b. A height of the sloped portion 770c decreases toward an apex 754a (shown in FIG. 10) of the wall portion 754 and is identical or similar to the height of the planar body 751 where the sloped portion 770c contacts the apex 754a of the wall portion 754. With this configuration, the weight guide 770 can guide the weight 701 smoothly from the linear path 705b to the bent path 705a as well as prevent the weight 701 from moving back from the bent path 705a to the linear path 705b.

Additionally, in the present embodiment, the wall portion 754 serves as the transition path limiter and the apex 754a of the wall portion 751 is its leading edge portion in a direction in which the weight 701 moves from the initial position 702 to the case-side impact detection position 706. The apex 754a is positioned at a downstream edge of the weight guide 770 in the weight moving direction from the initial position 702 to the case-side impact detection position 706, that is, on an extension line of the edge portion 720b of the weight guide 770. With this configuration, the weight 701 can move through the bent path 705a reliably when the impact detector 700 detects an impact, that is, the container to which the impact detector 700 is attached falls, and the weight 701 can move to the inspection window 711 when the container recovers the initial position.

Additionally, the case body 750 includes the weight receiving portion 774 corresponding to the lid-side impact detection position 704 and the weight receiving portion 775 corresponding to the case-side impact detection position 706. A weight stopper 776 that can be a projection extending in a direction perpendicular to the direction in which the weight 701 moves is formed in the weight receiving portion 774 to prevent the weight 701 from returning from the weight receiving portion 774 to the linear path 703c. The weight stopper 776 is sloped on the side of the linear path 703c to facilitate movement of the weight 701 to the lid-side impact detection position 704 while a side of the weight stopper 776 facing the lid-side impact detection position 704 is perpendicular to the weight receiving portion 774 to prevent the weight 701 from returning to the linear path 703c.

Additionally, sloped rails 771 and 772 are formed in the linear path 703c of the case-side transition path 705 and connected to the weight receiving portion 775. The sloped rails 771 and 772 guide the weight 701 moving through the linear path 705a of the case-side transition path 705 to the weight receiving portion 775. Leading edge portions 771a and 772a of the sloped rails 771 and 772 adjacent to the weight receiving portion 775 project from the weight receiving portion 775 slightly as shown in FIG. 14 to prevent the weight 701 from returning from the weight receiving portion 775 to the linear path 705c.

As described above, the impact detector 700 includes the lid-side transition path 703 and the case-side transition path 705 through which the weight 701 moves, both formed between the lid 710 and the case body 750. In the present embodiment, the wall portions 753 and 754 and the rails 755 and 756 formed in the lid-side transition path 703 and the wall portions 713 and 714 and the rails 715 and 716 formed in the case-side transition path 705 are rotationally symmetrical relative to a centerline penetrating vertically the impact detector 700 in the standing state. With this configuration, when the impact detector 700 falls in either the first direction to the side of the lid 710 or the second direction to the side of the case body 750, the weight 701 moves upward relatively in the impact detector 700 in FIGS. 10 and 12 toward the impact detection positions. In either the first direction or the second direction, the weight 701 is forced to move along the lid-side transition path 703 or the case-side transition path 705 as if the weight 701 was pushed from above. Therefore, the impact detector 700 can detect falling of the container to which the impact detector 700 is attached in both directions reliably. The impact detector 700 is effective particularly when the container falls at a relatively high velocity or a relatively large acceleration is given externally to the impact detector 700.

Next, operation of the impact detector 700 is described below.

When falling in the first direction to the side of the lid 710, the impact detector 700 operates as follows. In this case, the weight 701 moves from the initial position 702 along the linear path 703b on the rails 715 and 716 formed in the lid 710. As described above, the rail 715 is higher than the rail 716, and the weight 701 moves on the rails 715 and 716 while in contact with the wall portion 713. The weight 701 moving on the rails 715 and 716 tilts, and stops after overstriding the weight guide 720. Subsequently, when the impact detector 700 reverts to the initial standing state, the weight 701 moves along the bent path 703a, guided by the edge portion 720b of the weight guide 720. Then, the weight 701 is kept in the weight receiving portion 774 formed in the case body 750 and is positioned at the lid-side impact detection position 704. At that time, because the apex 714a of the wall portion 714 is on the extension line extending from the edge portion 720b of the weight guide 720, the weight 701 can move smoothly along the edge portion 720b to the linear path 703c. The weight 701 contained in the weight receiving portion 774 is prevented from moving back by the stopper 776 and is visible through the inspection window 712.

When falling in the second direction to the side of the case body 750, the impact detector 700 operates as follows. In this case, the weight 701 moves from the initial position 702 along the linear path 705b of the case-side transition path 705 on the rails 755 and 756 formed in the case body 750. As described above, the rail 755 is higher than the rail 756, and the weight 701 moves on the rails 755 and 756 while in contact with the wall portion 753. The weight 701 moving on the rails 755 and 756 tilts, and stops after overstriding the weight guide 770. Subsequently, when the impact detector 700 reverts to the initial standing state, the weight 701 moves along the bent path 705a, guided by the edge portion 720b of the weight guide 770. Then, the weight 701 is kept in the weight receiving portion 775 formed in the case body 750 and is positioned at the case-side impact detection position 706. At that time, because the apex 754a of the wall portion 754 is on the extension line extending from the edge portion 720b of the weight guide 770, the weight 701 can move smoothly along the edge portion 720b to the linear path 705c. The weight 701 contained in the weight receiving portion 775 is prevented from moving back by the leading edge portions 771a and 772a of the sloped rails 771 and 772 and is visible through the inspection window 711.

It is to be noted that the impact detector 700 according to the present embodiment can be combined with the impact detector 320 shown in FIG. 7A to detect the lateral falling and the impact from below. Further, the difference in height between a pair of rails 715 and 716 and between a pair of rails 755 and 756 can be applied to the rails 11a and 11b in the impact detector 100 according to the first embodiment.

Next, a packaging container provided with any of the impact detectors described above is described below.

Figure 17:
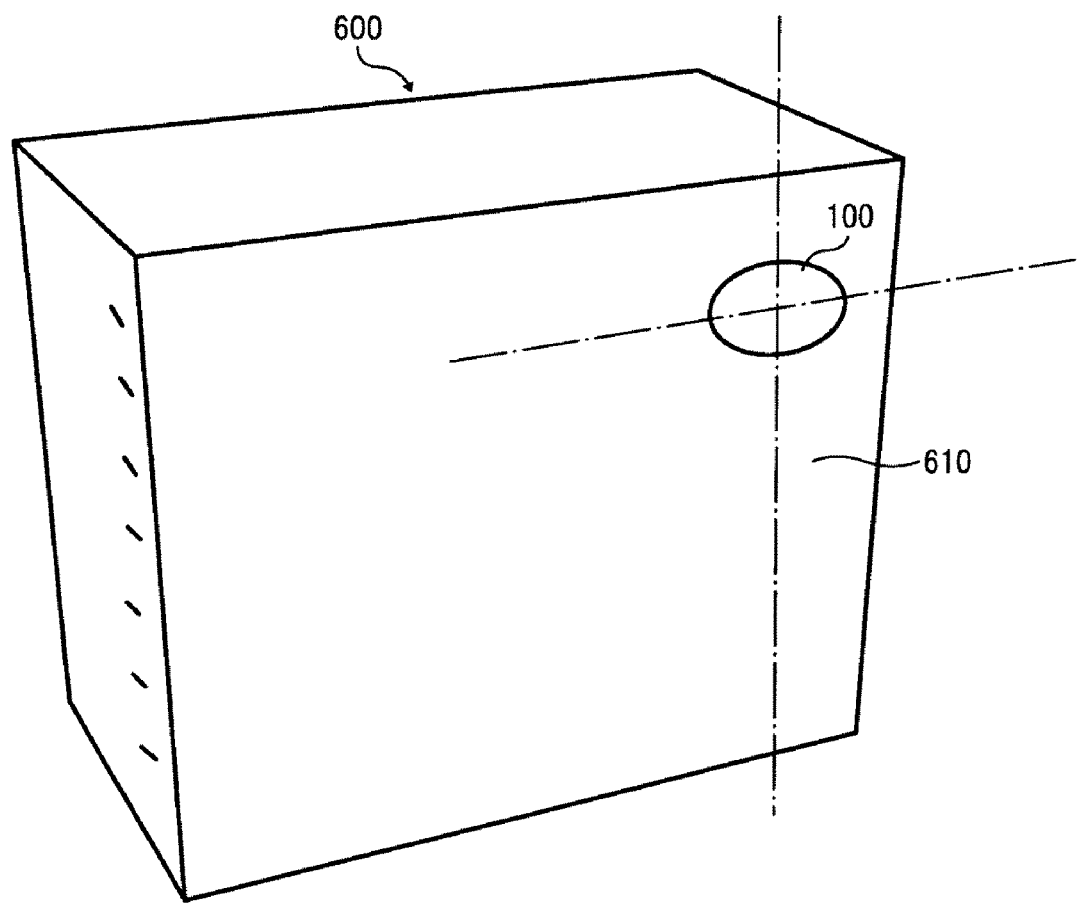
FIG. 17 is a perspective view illustrating a packaging container including the impact detector according to an illustrative embodiment.

FIG. 17 is a perspective view illustrating a packaging container 600 including the impact detector according to any of the above-described embodiments.

In the configuration shown in FIG. 17, the packaging container 600 is a corrugated box, and the impact detector 100 shown in FIGS. 1 through 5B according to the first embodiment is attached to a side surface 610 of the packaging container 600 with double-sided adhesive tape. Alternatively, the packaging container 600 can have a recess formed in the side surface 610 to accommodate the impact detector 100 so that the impact detector 100 is leveled with the vertical side surface 610. When the impact detector 100 is attached to the packaging container 600 as described above, it is possible that, when the packaging container 600 receives an impact, someone might removes the impact detector 100 from the packaging container 600, open the lid 1 shown in FIG. 1, and then return the weight 17a and 17b to the initial positions to delete the impact history. Herein, a label is typically attached the impact detector 100, and it may be used as a sealing and extend both the lid 1 and the case body 10 (shown in FIG. 1). It is preferred that adhesive applied on the adhesive surface of the label should include a material that can remain on the surface of the impact detector 100 at least partially when the label is removed. With this configuration, whether or not the impact history of the packaging container 600 is altered can be checked. It is to be noted that, any of the impact detectors according to the above-described second through fifth embodiments can be attached to the packaging container 600 instead of the impact detector 100.

As described above, because at least two of the multiple transition paths through which the weight moves when the packaging container to which the impact detector is attached falls in multiple different directions overlap with each other at least partly, the impact detector can be relatively compact.

Thus, by combining the impact detector such as shown in FIG. 7A that detects lateral falling and drop, that is, the impact from below and the anteroposterior impact detector to detect anteroposterior falling, history of falling in four directions, to the back side, the front side, the right side, and left side, can be indicated simultaneously with a single impact detector.

As described above, the impact detector according to any of the above-described embodiment includes a case, a first weight disposed inside the case, movable through at least one of two different paths when the case falls in a first direction and a second direction opposite the first direction, and an indicator disposed on a front side of the impact detector. The first transition path and the second transition path overlap each other at least partly on a projection plane parallel to a front side of the impact detector. When the first weight moves through at least one of the first transition path and the second transition path, impact history (falling history) in at least one of the first direction and the second direction is indicated in the indicator (inspection window).

In this configuration, the multiple transition paths through which the weight moves when the impact detector falls to opposite directions overlap each other at least partly, and the impact detector can be relatively compact.

Additionally, in each of the two different transition paths, multiple projections (e.g., rails 715, 716, 755, and 756) extending in the direction in which the weight moves when the case falls are arranged in the direction across the direction in which the weight moves. Each of the different transition paths includes a bent path in which the direction in which the weight moves is bent back to the indicator. The outer projection (e.g., rails 715 and 756) disposed on the outer circumference of the bent path has a height greater than the height of the inner projection (rails 716 and 755) disposed on the inner circumference of the bent path. In this configuration, because the impact detection positions of the weights are positioned outside of a center of the impact detector in the lateral direction, the weight can be guided to the through the transition paths to the impact detection positions smoothly.

Each of the transition paths further includes the linear path connecting together the initial position of the weight and the bent path, and the weight guide is provided in the connecting portion therebetween or the adjacent area. When the case falls, the weight guide prevents the weight moving through the linear path from returning to the linear path while guiding the weight to the bent path.

With this configuration, even if the weight has not yet reached the impact detection position when the case falls, the weight moving to the impact detection position can be prevented from returning around the bent path.

The impact detector further includes the pairs of transition path limiters (e.g., wall portions 713, 714, 753, and 754) forming the first transition path and the second transition path, disposed outside the projections (e.g., rails 715, 716, 755, and 756) formed in the first transition path and the second transition path. The transition path limiter inhibits deviation of the weight from the weight movement direction along the transition path to the direction crossing the weight movement direction. The height of the projection is set so that the edge portion (e.g., highest end portions 715b, 716b, 755b, and 756b) of the projection can contact the weight when the weight is in contact with the downstream portion (e.g., 714a and 754a) of the transition path limiter (e.g., wall portions 714 and 754) disposed on the inner circumference of the bent path.

With this configuration, the inclination of the weight moving through the transition path can be increased, facilitating smooth movement of the weight. Additionally, because the weight is inclined while moving, the case can be reduced in size in thickness, that is, the anteroposterior direction.

Additionally, in both the first and second transition paths, the downstream apex (714a and 754a) of the transition path limiter (wall portions 714 and 754) in the direction in which the weight moves from the initial position corresponds to the downstream edge of the weight guide.

With this configuration, the weight can move adjacent the bent path reliably when the impact detector detects an impact, and the weight can move toward the inspection window 711 reliably when the container recovers the initial position.

Additionally, in the above-described embodiments, the case includes the lid and the case body corresponding to the two different directions or opposite directions, respectively. The first transition path and the projections provided therein are formed in one of the lid and the case body, and the second transition path and the projections provided therein are formed in the other. In the present embodiment, the multiple projections formed in the first transition path and the multiple projections formed in the second transition path are rotationally symmetrical relative to the centerline penetrating vertically the impact detector on the front projection plane. With this configuration, when the impact detector falls to either the first direction to the side of the lid or the second direction to the side of the case body, the weight moves upward relatively in the impact detector toward the impact detection positions. In either the first direction or the second direction, the weight is forced to move along the transition path, pushed from above. Therefore, the impact detector can detect falling of the container to which the impact detector is attached in both directions reliably. The impact detector is effective particularly when the container falls at a relatively high velocity or a relatively large acceleration is given externally to the impact detector.

The impact detector further includes the third transition path, the fourth transition path, the third indicator, and the fourth indicator. The weight moves through the third transition path and the fourth transition path when the case falls to the third direction, perpendicular to the first and second directions, and a fourth direction opposite the third direction. The third and fourth indicators indicate whether or not the impact detector has fallen in the third and fourth direction, respectively. The first, second, third, and fourth transition paths communicate with each other so that the weight can move therebetween, and the first, second, third, and fourth indicators can maintain the impact indication states even after the weight returns to the initial position. With the configuration, the impact history in the four different directions, that is, to the front side, the back side, the right side, and the left side can be indicated with a single weight, and thus the impact detector can be relatively simple.

In another embodiment, the impact detector further includes the third, fourth, and fifth weights contained in the case, and the third, fourth, and fifth indicators. The third weight moves through the third transition path when the case falls in the third directions, perpendicular to the first and second directions, and causes the third indicator to indicate the impact history in the third direction. The fourth weight moves through the fourth transition path when the case falls in the fourth directions opposite the third direction, and causes the fourth indicator to indicate the impact history in the fourth direction. The fifth weight moves through the fifth transition path when the case drops, that is, receives impact from below and causes the fifth indicator to indicate the drop history. The first, third, fourth, and fifth indicators can keep the impact indication states even after the weight returns to the initial position. With the configuration, a single impact detector can indicate the impact history in the four different directions, that is, to the front side, the back side, the right side, and the left side as well as the drop history simultaneously.

The first weight can has a circular periphery, and the first transition path and the second transition path can be disposed to overlap in the anteroposterior direction, that is, the direction of thickness of the weight, in the direction in which the case is projected on a plane. Thus, the impact detector can be thinner.

Numerous additional modifications and variations are possible in light of the above teachings. It is therefore to be understood that, within the scope of the appended claims, the disclosure of this patent specification may be practiced otherwise than as specifically described herein.

What is claimed is:

1. An impact detector comprising:
    a case, an interior of which defines a first transition path and a second transition path;
    an impact indicator disposed on a front side of the case, to indicate an impact history of the impact detector when the case falls to at least one of a first direction and a second direction opposite the first direction;
    a first weight disposed inside the case, that moves to a side to which the case falls, causing the impact indicator to indicate the impact history by moving through at least one of the first transition path and the second transition path;
    a first guide member to guide the first weight from an initial position to a first impact detection position along the first transition path when the case falls in the first direction; and
    a second guide member to guide the first weight from the initial position to the second impact detection position along the second transition path when the case falls in the second direction;
    wherein the first transition path at least partly overlaps with the second transition path on a projection plane on the front side of the case.

2. The impact detector according to claim 1, wherein the first guide member comprises multiple projections formed in the case, each extending along the first transition path, arranged in a direction intersecting a first weight movement direction in which the first weight moves through the first transition path to the first impact detection position,
    the second guide member comprises multiple projections formed in the case, each extending along the second transition path, arranged in a direction intersecting a second weight movement direction in which the first weight moves from the initial position to the second impact detection position,
    the first weight contacts the multiple projections of the first guide member and the second guide member when the case falls in the first direction and the second direction, respectively,
    the first transition path includes a bent portion to bend the first weight movement direction toward the first impact detection position,
    the second transition path includes a bent portion to bend the second weight movement direction toward the second impact detection position, and
    the multiple projections of each of the first guide member and the second guide member include an inner projection disposed on an inner circumference side of the bent portion and an outer projection disposed on an outer circumference side of the bent portion, having a height greater than a height of the inner projection.

3. The impact detector according to claim 2, wherein each of the first transition path and the second transition path further comprises a linear portion connecting the initial position and the bent portion and a weight guide disposed around a connecting portion between the linear portion and the bent portion, each weight guide comprises a sloped portion on a side of the linear portion and a step portion on a side of the bent portion, and the weight guide guides the first weight moving through the linear portion to the bent portion and prevents the first weight from returning to the linear portion when the case reverts to an initial state from a falling state.

4. The impact detector according to claim 3, further comprising:
a pair of first transition path limiters extending along the first transition path, including an inner limiter disposed on the inner circumference side and an outer limiter disposed on the outer circumference side of the bent portion of the first transition path, on both sides of the multiple projections formed therein, to inhibit deviation of the first weight toward the direction intersecting the first transition path, and a pair of second transition path limiters extending along the second transition path, including an inner limiter disposed on the inner circumference side and an outer limiter disposed on the outer circumference side of the bent portion of the second transition path, on both sides of the multiple projections formed therein, to inhibit deviation of the first weight toward the direction intersecting the second transition path, wherein, in the first weight movement direction and the second weight movement direction, a downstream apex of the inner limiter of each of the pair of first transition path limiters and the pair of second transition path limiter corresponds to a downstream edge portion of the weight guide in each of the first transition path and the second transition path.

5. The impact detector according to claim 2, further comprising:
a pair of first transition path limiters extending along the first transition path, including an inner limiter disposed on the inner circumference side and an outer limiter disposed on the outer circumference side of the bent portion of the first transition path, on both sides of the multiple projections formed therein, to inhibit deviation of the first weight toward the direction intersecting the first transition path; and a pair of second transition path limiters extending along the second transition path, including an inner limiter disposed on the inner circumference side and an outer limiter disposed on the outer circumference side of the bent portion of the second transition path, on both sides of the multiple projections formed therein, to inhibit deviation of the first weight toward the direction intersecting the second transition path, wherein an edge portion of a respective one of the multiple projections facing the first weight contacts the first weight when the first weight is in contact with a downstream portion of the inner limiter of each of the pair of first transition path limiters and the pair of second transition path limiters in the first weight movement direction and the second weight movement direction.

6. The impact detector according to claim 5, wherein the case further comprises a lid disposed on the first direction and a case body disposed on the second direction,
the first transition path as well as the multiple projections of the first guide member are formed on the lid,
the second transition path as well as the the multiple projections of the second guide member are formed in the case body, and
on the projection plane on the front side of the case, the multiple projections of the first guide members and the multiple projections of the second guide member are rotationally symmetrical relative to a centerline penetrating the case vertically.

7. The impact detector according to claim 2, wherein the case further comprises a lid disposed on the first direction and a case body disposed on the second direction,
the first transition path as well as the multiple projections of the first guide member are formed on the lid,
the second transition path as well as the the multiple projections of the second guide member are formed in the case body, and
on the projection plane on the front side of the case, the multiple projections of the first guide members and the multiple projections of the second guide member are rotationally symmetrical relative to a centerline penetrating the case vertically.

8. The impact detector according to claim 1, wherein each of the first transition path and the second transition path comprises:
a linear portion leading from the initial position;
a bent portions arcing from the linear portion; and
a weight guide disposed around a connecting portion between the linear portion and the bent portion, including a sloped portion disposed on a side of the linear portion and a step portion disposed on a side of the bent portion,
wherein the bent portions of the first and second transition paths bend the first and second weight movement directions toward the first and second impact detection positions, respectively, and
wherein the weight guide guides the first weight moving through the linear portion to the bent portion and prevents the first weight from returning to the linear portion when the case reverts to an initial state from a falling state.

9. The impact detector according to claim 1, further comprising a second weight,
wherein the case comprises a lid disposed on the first direction, on which the first transition path including the initial position is formed,
a case body disposed on the second direction, in which the second transition path including another initial position is formed,
a first regulation member projecting from an inner face of the case body prevents the first weight from moving to the second transition path,
a second regulation member projecting from an inner face of the lid to prevent the second weight from moving to the first transition path,
a first initial position retainer to retain the first weight at the initial position in the first transition path, and
a second initial position retainer to retain the second weight at the initial position in the second transition path,
wherein the first weight moves through the first transition path and remains at the first impact detection position when the case falls in the first direction,
the second weight moves through the second transition path and remains at the second impact detection position when the case falls in the second direction,
the impact indicator maintains an impact indication state in the first direction with the first weight at the first impact detection position and an impact indication state in the second direction with the second weight at the second impact detection position.

10. The impact detector according to claim 1, further comprising:
a third guide member extending from the initial position in a third direction perpendicular to the first direction and the second direction, to guide the first weight along a third transition path;
a fourth guide member extending from the initial position in a fourth direction opposite the third direction, to guide the first weight along a fourth transition path; and
a pivotable member having a free end portion provided with a flag that moves to the impact indicator when the first weight contacts the pivotable member, disposed in each of the first transition path, the second transition path, the third transition path and the fourth transition path,
wherein the impact indicator includes a first indicator to indicate an impact history in the first direction, a second indicator to indicate an impact history in the second direction, a third indicator to indicate an impact history in the third direction, and a fourth indicator to indicate an impact history in the fourth direction,
the first transition path, the second transition path, the third transition path, and the fourth transition path communicate with each other and the first weight moves among the first transition path, the second transition path, the third transition path, and the fourth transition path, and
each of the first indicator, the second indicator, the third indicator, and the fourth indicator of the impact indicator maintains an impact indication state caused by the first weight.

11. The impact detector according to claim 1, wherein the impact indicator comprises a first indicator to indicate an impact history in the first direction and the second direction, a second indicator to indicate an impact history in a third direction perpendicular to the first direction and the second direction, a third indicator to indicate an impact history in a fourth direction opposite the third direction, and a fourth indicator to indicate a drop history,
the impact detector further comprises:
a second weight to move in the third direction perpendicular to the first direction and the second direction, causing the second indicator to indicate the impact history in the third direction by moving through the third transition path;
a third guide member provided in the case, to guide the second weight from a second initial position to a third impact detection position along a third transition path formed in the case when the case falls in the third direction;
a third weight to move in the fourth direction, causing the third indicator to indicate the impact history in the fourth direction by moving through the fourth transition path;
a fourth guide member provided in the case, to guide the fourth weight from a third initial position to a fourth impact detection position when the case falls in the fourth direction;
a fourth weight to cause the fourth indicator to indicate a drop state by dropping to a drop detection position through a fifth transition path formed in the case when the case recieves impact from below; and
a pair of fourth weight supporters to support the fourth weight at a fourth weight initial position from both sides and to release the fourth weight when the case recieves the impact from below.

12. The impact detector according to claim 1, wherein the first weight has a circular periphery, and
the first transition path at least partly overlaps the second transition path in a direction of thickness of the first weight.

13. The impact detector according to claim 1, wherein the case further comprises a lid disposed on the first direction and a case body disposed on the second direction,
a portion of the first transition path and a portion of the second transition path overlapped each other are formed on the lid and the case body, respectively, and
the first transition path communicates with the second transition path in a depth direction penetrating the projection plane on the front side of the case.

14. The impact detecotr according to claim 13, wherein the first weight has a circular periphery,
the first guide member includes a lower portion having a height lower than a height of the first weight, positioned in the portion of the first transition path overlapped with the second transition path, and
the second guide member includes a lower portion having a height lower than a height of the first weight, positioned in the portion of the second transition path overlapped with the first transition path.

15. The impact detecotr according to claim 13, wherein the first guide member comprises multiple projections formed in the case, each extending along the first transition path, arranged in a direction intersecting a first weight movement direction in which the first weight moves through the first transition path to the first impact detection position,
the second guide member comprises multiple projections formed in the case, each extending along the second transition path, arranged in a direction intersecting a second weight movement direction in which the first weight moves through the second transition path to the second impact detection position, and
the first weight contacts the multiple projections of the first guide member and the second guide member when the case falls in the first direction and the second direction, respectively.

16. The impact detecotr according to claim 13, wherein the impact indicator comprises a first indicator to indicate an impact history in the first direction and a second indicator to indicate an impact history in the second direction, and
the portion of the first transition path and the portion of the second transition path overlapping each other are positioned between the first indicator and the second indicator on the projection plane on the front side of the case.

17. The impact detecotr according to claim 1, wherein the impact indicator comprises a first indicator to indicate an impact history in the first direction and a second indicator to indicate an impact history in the second direction, and
the portion of the first transition path and the portion of the second transition path overlapping each other are positioned between the first indicator and the second indicator on the projection plane on the front side of the case.

18. The impact detecotr according to claim 17, wherein the first weight has a circular periphery,
the first guide member includes a lower portion having a height lower than a height of the first weight, positioned in the portion of the first transition path overlapped with the second transition path, and
the second guide member includes a lower portion having a height lower than a height of the first weight, positioned in the portion of the second transition path overlapped with the first transition path.

19. The impact detector according to claim 1, incorporated in a packaging container for containing an article.

20. An impact detector comprising:
- a case, an interior of which defines a first transition path and a second transition path;
- an impact indicating means for indicating, on a front side of the case, an impact history of the impact detector when the case falls in at least one of a first direction and a second direction opposite the first direction;
- a first weight disposed inside the case, that moves to a side to which the case falls, causing the impact indicating means to indicate the impact history by moving through at least one of the first transition path and the second transition path;
- a first guide means for guiding the first weight from an initial position to a first impact detection position along the first transition path when the case falls in the first direction; and
- a second guide means for guiding the first weight from the initial position to the second impact detection position along the second transition path when the case falls in the second direction;
- wherein the first transition path at least partly overlaps with the second transition path on a projection plane on the front side of the case.

\* \* \* \* \*